(12) United States Patent
Lewis et al.

(10) Patent No.: US 10,178,343 B2
(45) Date of Patent: *Jan. 8, 2019

(54) METHOD AND APPARATUS FOR INTERACTIVE TWO-WAY VISUALIZATION USING SIMULTANEOUSLY RECORDED AND PROJECTED VIDEO STREAMS

(71) Applicant: The SuperGroup Creative Omnimedia, Inc., Atlanta, GA (US)

(72) Inventors: John Bradford Lewis, Atlanta, GA (US); John Gabriel Aldridge, College Park, GA (US); John Michael Preziotti, Kennesaw, GA (US)

(73) Assignee: The SuperGroup Creative Omnimedia, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,985

(22) Filed: Mar. 23, 2017

(65) Prior Publication Data

US 2017/0264856 A1 Sep. 14, 2017

Related U.S. Application Data

(63) Continuation of application No. 14/305,874, filed on Jun. 16, 2014, now Pat. No. 9,609,265.

(Continued)

(51) Int. Cl.
*H04N 5/77* (2006.01)
*G06F 15/16* (2006.01)
(Continued)

(52) U.S. Cl.
CPC ............... *H04N 5/77* (2013.01); *G06F 3/038* (2013.01); *G06F 3/0488* (2013.01); *G06Q 20/18* (2013.01);
(Continued)

(58) Field of Classification Search
CPC ........ H04N 5/77; H04N 7/144; H04N 9/8042; H04N 1/2112; H04N 5/772; G11B 31/006; H03N 9/045; G07F 11/62; G07F 17/0092
(Continued)

(56) References Cited

U.S. PATENT DOCUMENTS 4,468,092 A 8/1984 Inoue et al.
4,708,435 A 11/1987 Yata et al.
(Continued)

FOREIGN PATENT DOCUMENTS

WO 2015044033 A1 4/2015

OTHER PUBLICATIONS

Search Report and Written Opinion for International Patent Application No. PCT/US2014/042544; dated Oct. 28, 2014.

(Continued)

*Primary Examiner* — Thai Q Tran
*Assistant Examiner* — Syed Y Hasan
(74) *Attorney, Agent, or Firm* — Barnes & Thornburg LLP; Jason Bernstein

(57) ABSTRACT

A system and method for point to point video enable communication and the provisioning of at least one commodity. The communication between two remote devices may include both video and audio and may be activated by use of at least one touch screen associated with a device for provisioning the at least one commodity, such as, for example, a vending machine.

9 Claims, 24 Drawing Sheets

Related U.S. Application Data

(60) Provisional application No. 61/835,578, filed on Jun. 15, 2013.

(51) Int. Cl.

| | | |
|---|---|---|
| *G06F 17/00* | (2006.01) | |
| *G09G 5/00* | (2006.01) | |
| *G06F 3/038* | (2013.01) | |
| *H04L 29/06* | (2006.01) | |
| *G07F 11/00* | (2006.01) | |
| *G07F 5/00* | (2006.01) | |
| *H04N 7/14* | (2006.01) | |
| *H04N 9/804* | (2006.01) | |
| *H04N 9/31* | (2006.01) | |
| *G06F 3/0488* | (2013.01) | |
| *G06Q 20/18* | (2012.01) | |
| *H04N 13/363* | (2018.01) | |
| *G03B 21/62* | (2014.01) | |
| *H04N 13/30* | (2018.01) | |

(52) U.S. Cl.
CPC .............. *G07F 5/00* (2013.01); *G07F 11/002* (2013.01); *H04L 29/06462* (2013.01); *H04N 5/772* (2013.01); *H04N 7/144* (2013.01); *H04N 9/3179* (2013.01); *H04N 9/3194* (2013.01); *H04N 9/8042* (2013.01); *H04N 13/363* (2018.05); *G03B 21/62* (2013.01); *H04N 2013/403* (2018.05)

(58) Field of Classification Search
USPC .................. 386/224; 345/156; 700/232, 237; 709/231; 348/222.1
See application file for complete search history.

(56) References Cited

U.S. PATENT DOCUMENTS

| | | |
|---|---|---|
| 4,729,631 A | 3/1988 | Takahashi et al. |
| 5,400,069 A | 3/1995 | Braun et al. |
| 6,078,351 A | 6/2000 | Hall, Jr. et al. |
| 6,144,797 A * | 11/2000 | MacCormack ... G06F 17/30017 348/E5.099 |
| 6,542,695 B1 | 4/2003 | Akiba et al. |
| 6,550,521 B1 | 4/2003 | McNabb |
| 6,774,912 B1 | 8/2004 | Ahmed et al. |
| 6,814,443 B2 | 11/2004 | Safran et al. |
| 6,829,086 B1 | 12/2004 | Gibilini |
| 7,346,271 B2 | 3/2008 | Komi et al. |
| 7,433,179 B2 | 10/2008 | Hisano et al. |
| 8,035,624 B2 | 10/2011 | Bell et al. |
| RE43,462 E | 6/2012 | Washino et al. |
| 8,250,617 B2 | 8/2012 | Hensgen et al. |
| 8,298,081 B1 | 10/2012 | Merritt et al. |
| 8,777,224 B2 | 7/2014 | Gadda et al. |
| 8,921,473 B1 | 12/2014 | Hyman |
| 9,214,098 B2 | 12/2015 | Carlsson et al. |
| 9,609,265 B2 | 3/2017 | Lewis et al. |
| 2004/0257473 A1 | 12/2004 | Miyagawa |
| 2005/0178823 A1 | 8/2005 | Kuwahara et al. |
| 2006/0095340 A1 | 5/2006 | Iadanza et al. |
| 2007/0186002 A1 | 8/2007 | Campbell et al. |
| 2008/0052090 A1 | 2/2008 | Heinemann et al. |
| 2008/0150890 A1 | 6/2008 | Bell et al. |
| 2008/0152304 A1 | 6/2008 | Yoo et al. |
| 2009/0049395 A1 | 2/2009 | Lee et al. |
| 2009/0102763 A1 | 4/2009 | Border et al. |
| 2010/0007773 A1 | 1/2010 | O'Connell et al. |
| 2010/0159874 A1 | 6/2010 | Lewis et al. |
| 2010/0198400 A1 | 8/2010 | Pascal et al. |
| 2010/0259058 A1 | 10/2010 | Knighton et al. |
| 2011/0102320 A1 | 5/2011 | Hauke et al. |
| 2011/0112913 A1 | 5/2011 | Murray |
| 2011/0164163 A1 | 7/2011 | Bilbrey et al. |
| 2011/0184812 A1 | 7/2011 | Stoulil |
| 2011/0207504 A1 | 8/2011 | Anderson et al. |
| 2012/0127128 A1 | 5/2012 | Large et al. |
| 2012/0200662 A1 | 8/2012 | Wu |
| 2012/0206560 A1 | 8/2012 | Setton |
| 2012/0229590 A1 | 9/2012 | Barrus |
| 2012/0287321 A1 | 11/2012 | Border et al. |
| 2013/0018735 A1 | 1/2013 | Walker et al. |
| 2013/0043271 A1 | 2/2013 | South et al. |
| 2013/0050573 A1 | 2/2013 | Syed et al. |
| 2013/0120568 A1 | 5/2013 | Jensen, II |
| 2013/0215214 A1 | 8/2013 | Dhopte et al. |
| 2013/0326250 A1 | 12/2013 | Sullivan et al. |
| 2014/0152584 A1 | 6/2014 | Matthews et al. |
| 2014/0164927 A1 | 6/2014 | Salaverry et al. |
| 2014/0369660 A1 | 12/2014 | Lewis et al. |
| 2015/0042746 A1 | 2/2015 | Lewis et al. |

OTHER PUBLICATIONS

Inernational Preliminary Report on Patentability for International Patent Application No. PCT/US2014/042541, dated Dec. 23, 2015.
Search Report for International Patent Application No. PCT/US2014/042541, dated Dec. 11, 2014.
International Preliminary Report on Patentability for International Patent Application No. PCT/US2016/035994, dated Dec. 5, 2017.
Search Report for International Patent Application No. PCT/US2016/035994, dated Sep. 2, 2016.
Office Action for European Patent Application No. 14810967.1; dated Jul. 30, 2018.

* cited by examiner

METHOD AND APPARATUS FOR INTERACTIVE TWO-WAY VISUALIZATION USING SIMULTANEOUSLY RECORDED AND PROJECTED VIDEO STREAMS

CROSS-REFERENCE TO RELATED APPLICATIONS

This application is a continuation of co-pending U.S. patent application Ser. No. 14/305,874, filed Jun. 16, 2014, which claims priority to U.S. Provisional Patent Application Ser. No. 61/835,578, filed Jun. 15, 2013, both entitled METHOD AND APPARATUS FOR INTERACTIVE TWO-WAY VISUALIZATION USING SIMULTANEOUSLY RECORDED AND PROJECTED VIDEO STREAMS, the entirety of which are expressly incorporated herein by reference in their entireties.

FIELD OF THE INVENTION

The present disclosure relates, in exemplary embodiments, to apparatus and methods for recording and projecting video images onto and through an interactive touch screen. Active shutter 3-D technology allows the apparatus to project two images at once and present one view to the camera to see one image and the person standing in front of the machine to see another.

SUMMARY

The present disclosure provides for an apparatus for simultaneously recording a first live video stream and projecting a second live video stream onto an interactive touch screen. Such an apparatus may comprise a touch screen panel, a polarized acrylic screen, at least one video camera having a lens; an active shutter lens having a liquid crystal layer sandwiched between a first and a second outer layer, the active shutter lens being proximate to the video camera lens; a projector adapted to project an image onto the polarized acrylic screen; a first computer; a second computer; and a means for connecting to the internet. The apparatus may also be equipped to dispense objects such as, for example, sodas and other vending machine products.

Also provided is a method of facilitating communicating between two remote locations, comprising recording a first video stream through a first device in accordance with a first indication wherein the first indication is indicative of at least one interaction by a first user with the first device, receiving at the first device a second video stream recorded at a second device in accordance with a second indication wherein the second indication is indicative of at least one interaction by a second user with the second device, and providing at least one good at the first device in accordance with the second indication, wherein the first device is remote from the second device.

Thus, apparatus and method are provided for simultaneous live recording through and projecting live video images onto an interactive touch screen, and the relevant services typically associated therewith. It is to be understood that both the foregoing general description and the following detailed description are exemplary and explanatory, and are intended to provide further explanation of the invention as discussed herein throughout.

BRIEF DESCRIPTION OF THE DRAWINGS

The drawings disclose exemplary embodiments in which like reference characters designate the same or similar parts throughout the figures of which.

DETAILED DESCRIPTION

Figure 1:
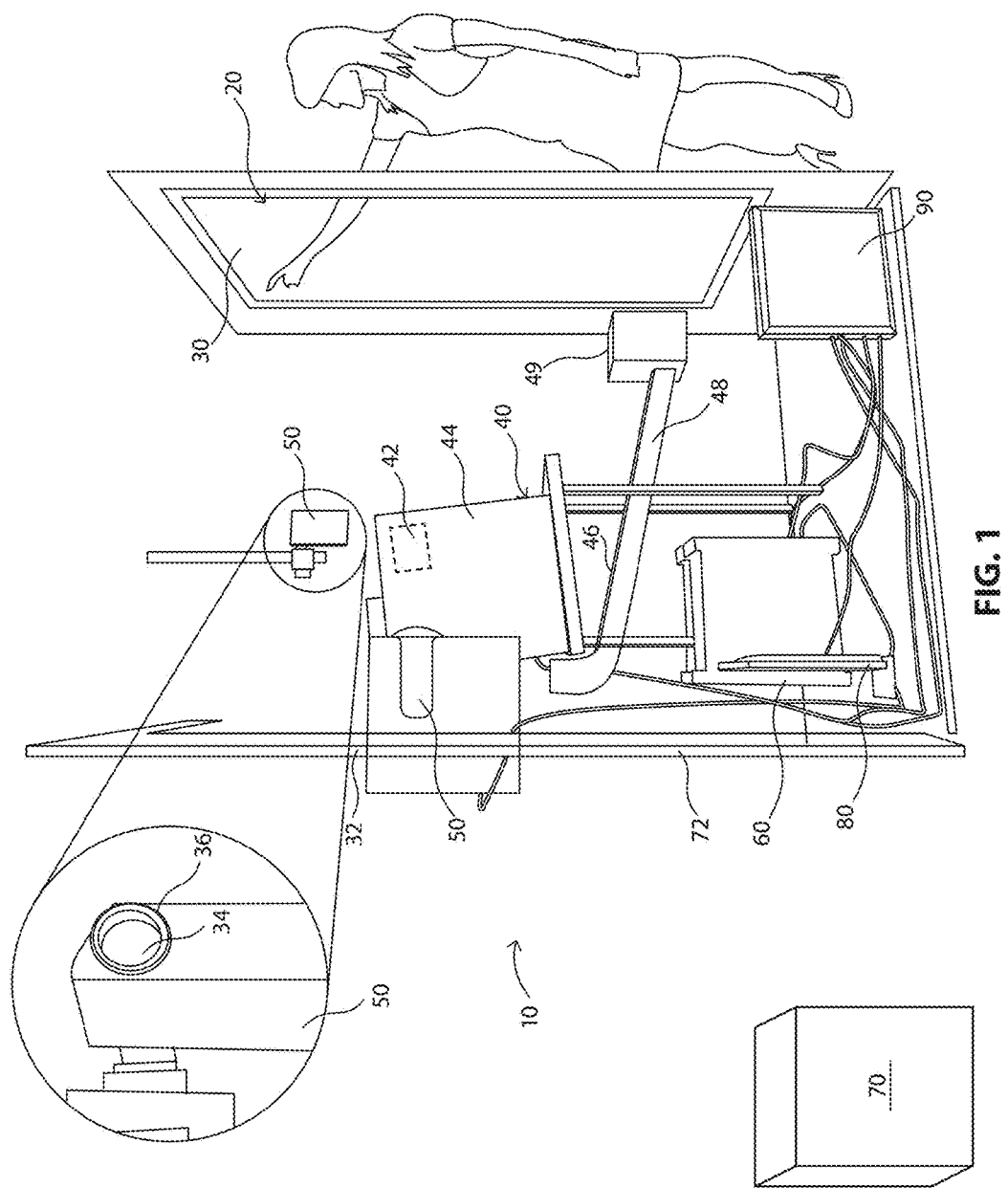
FIG. 1 is a perspective schematic view of one exemplary embodiment of an apparatus according to the present disclosure.
Figure 2:
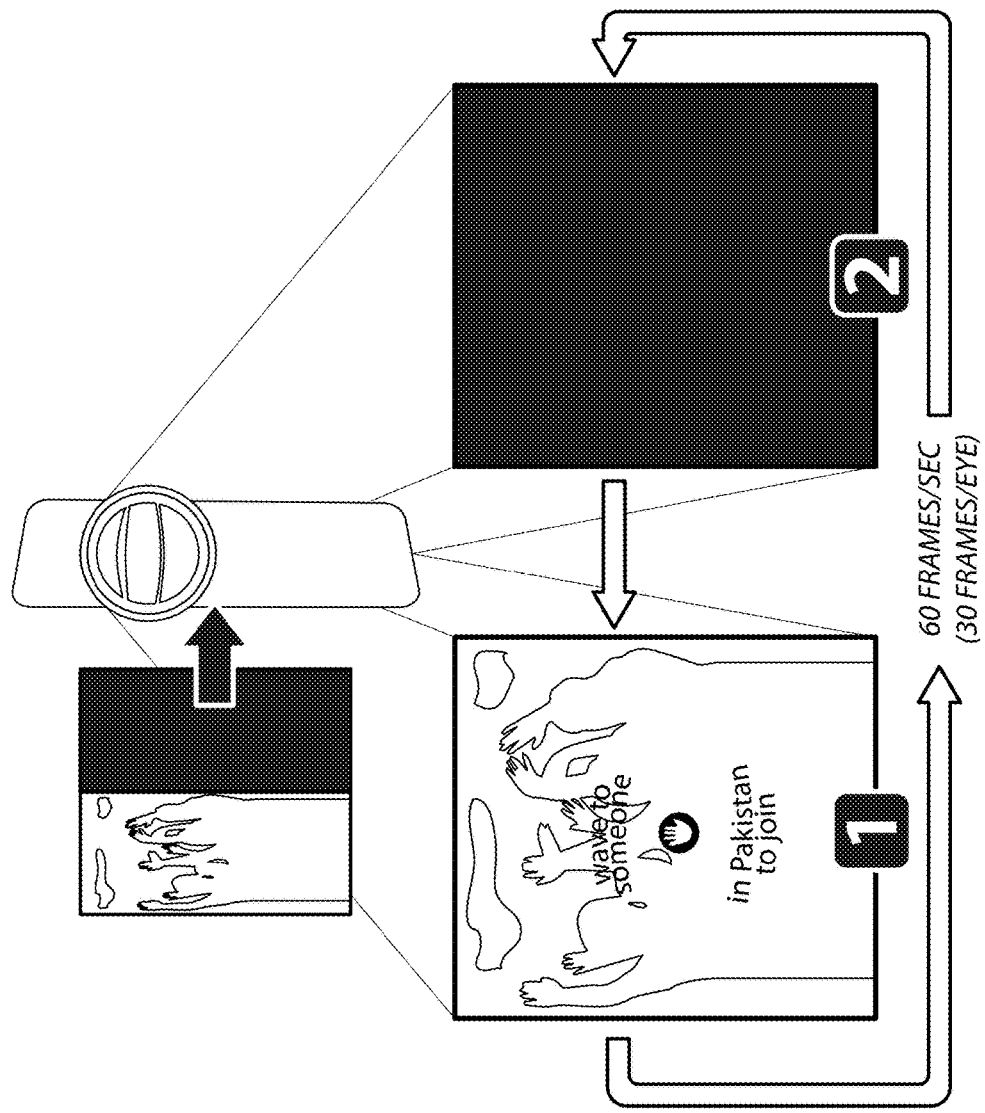
FIGS. 2-17 are various views of perspectives and details of exemplary embodiments of the apparatus.
Figure 3:
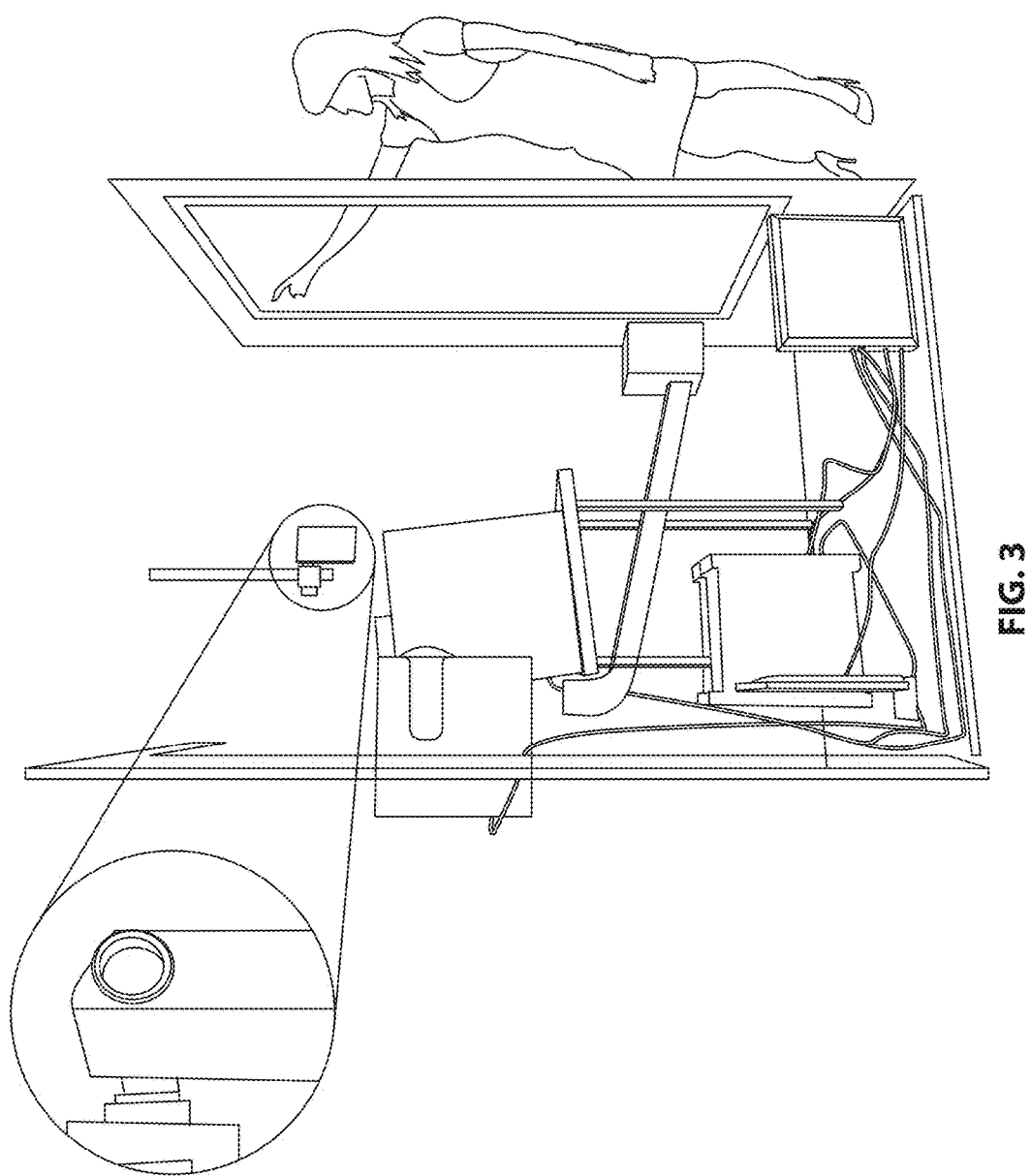
Figure 4:
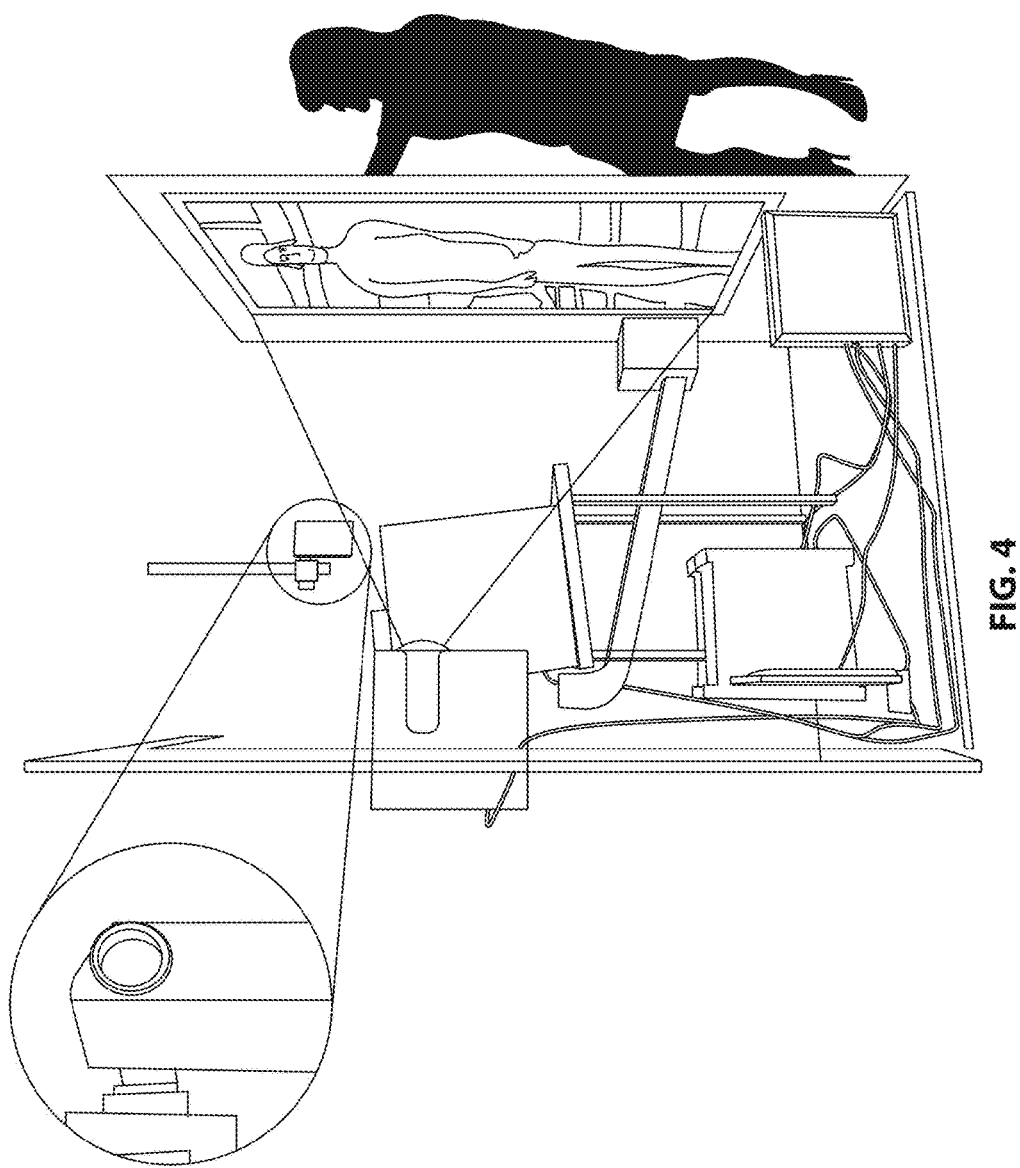
Figure 5:
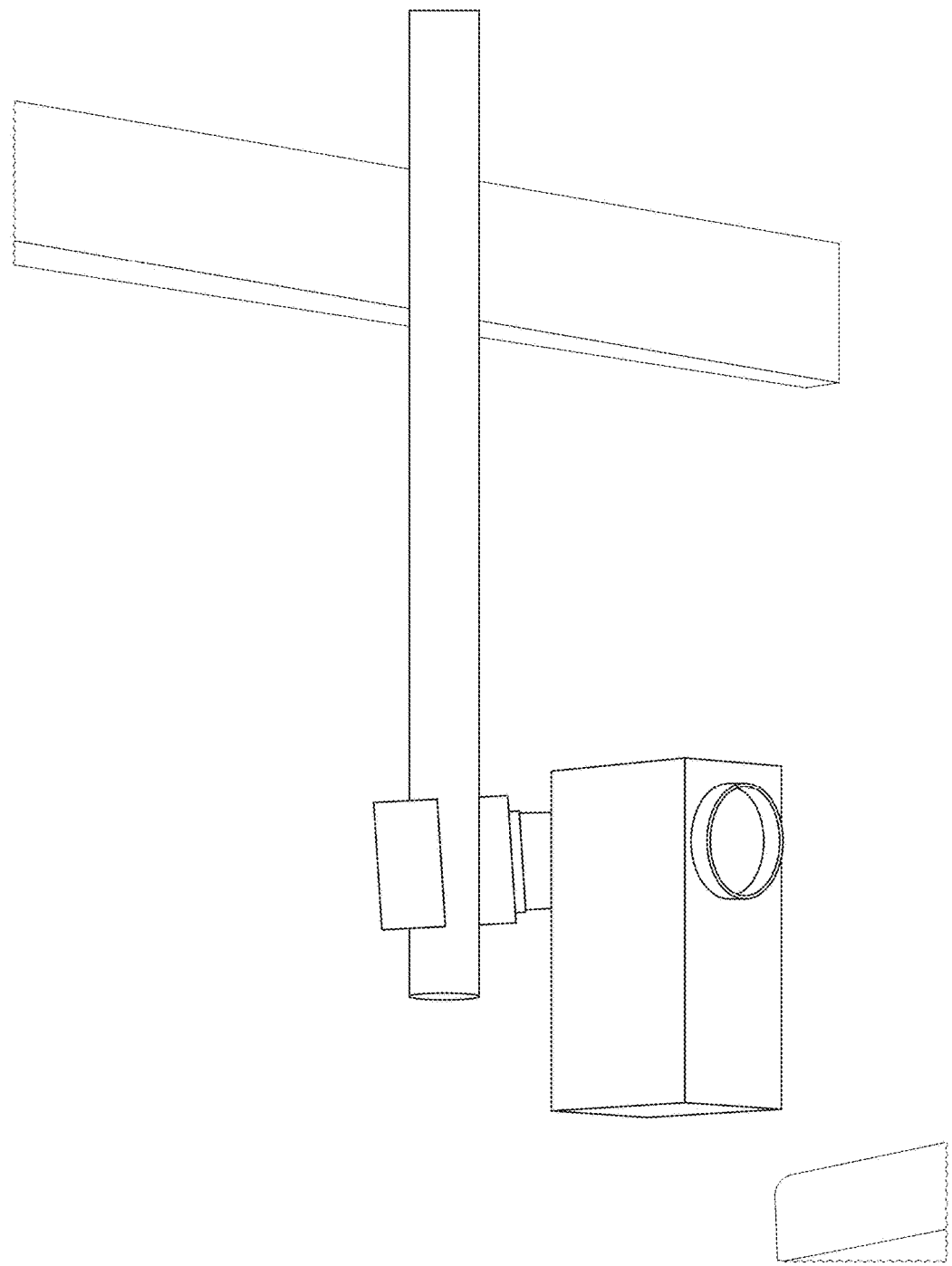
Figure 6:
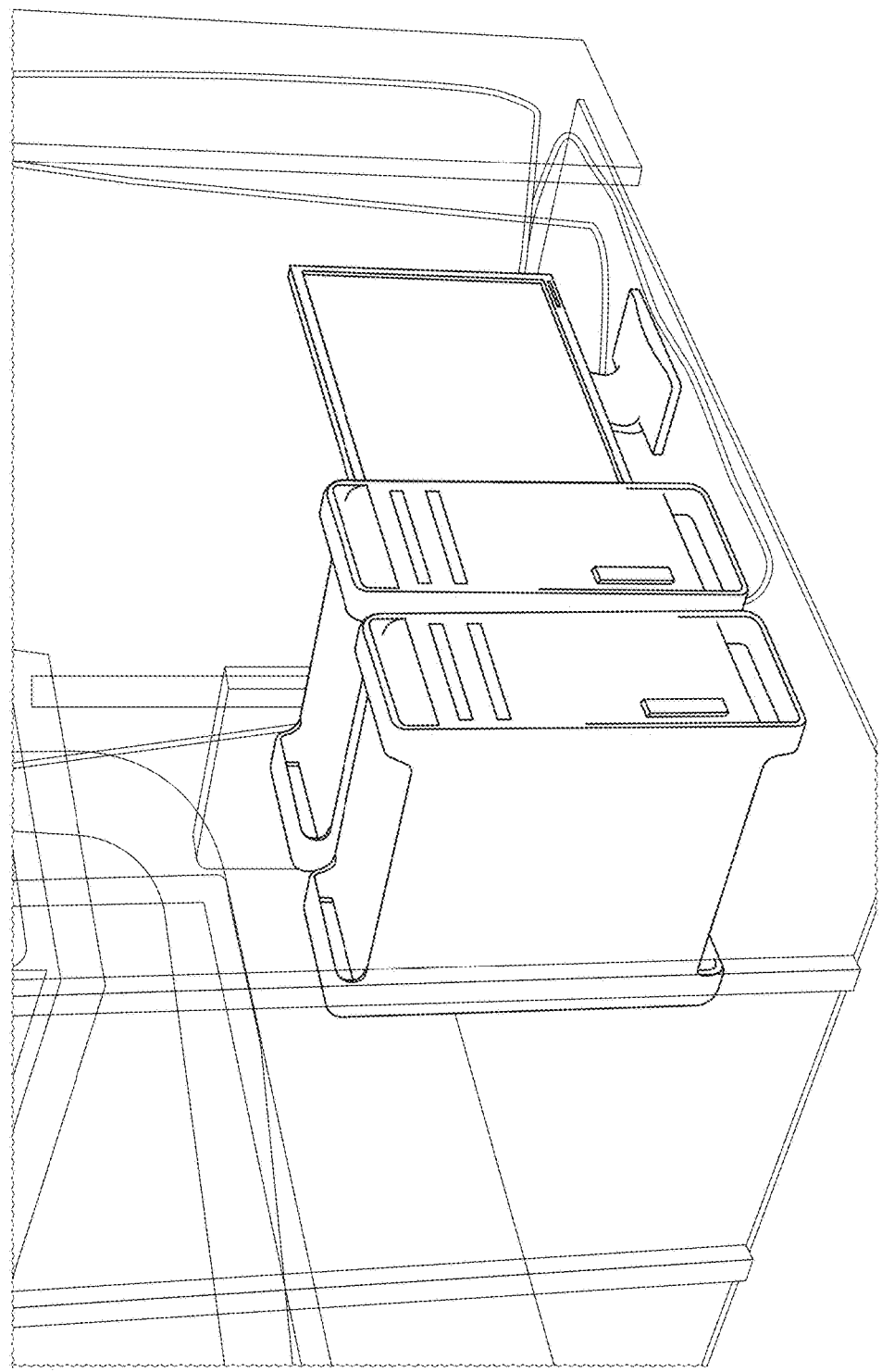
Figure 7:
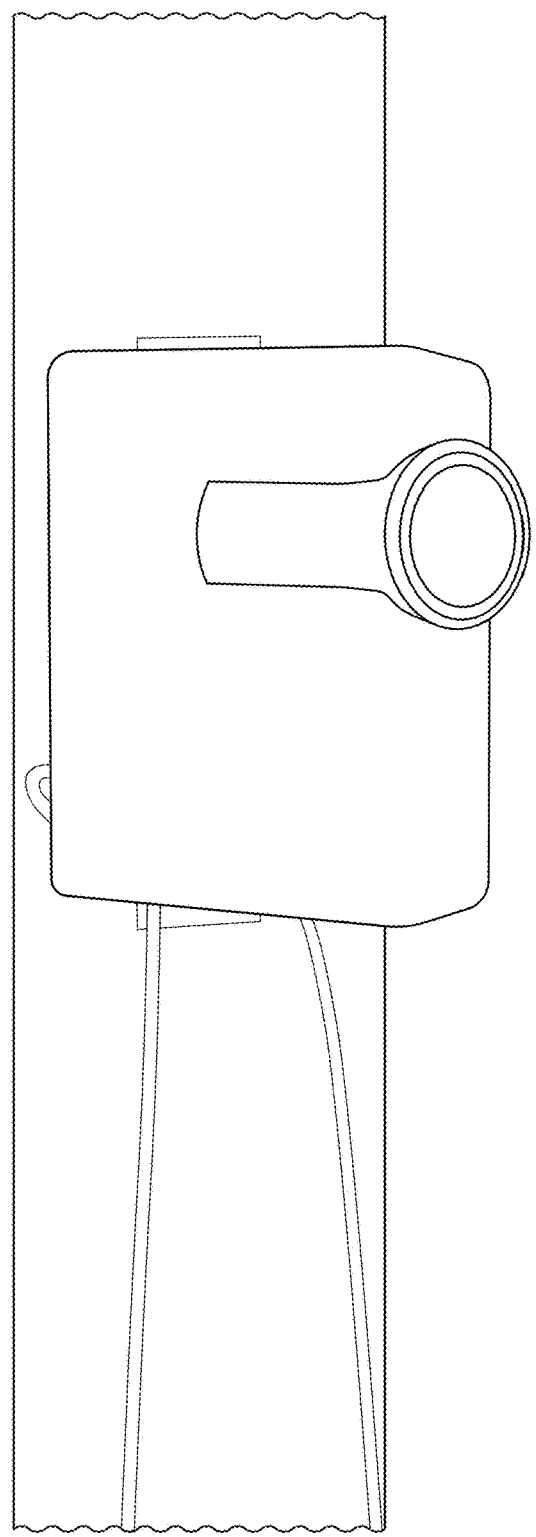
Figure 8:
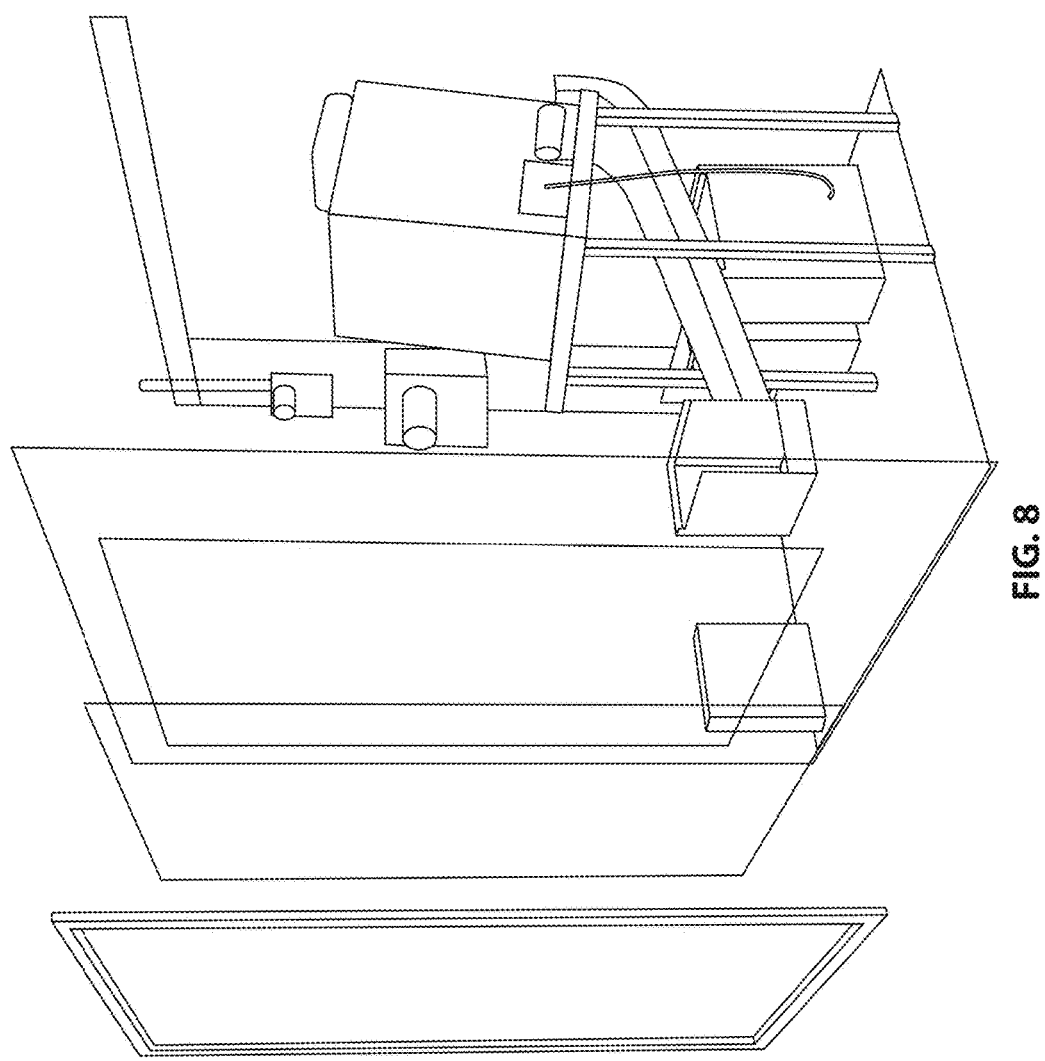
Figure 9:
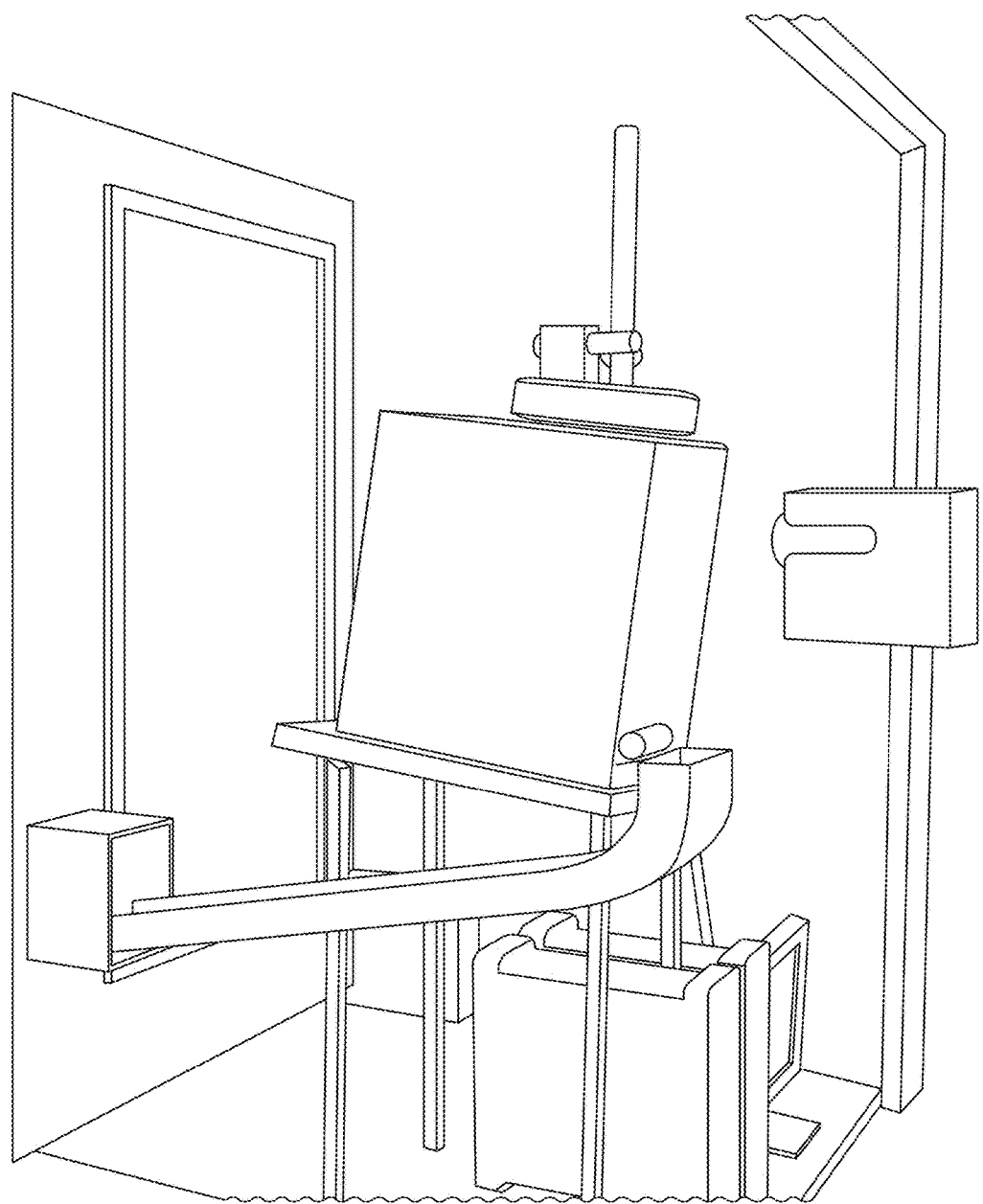
Figure 10:
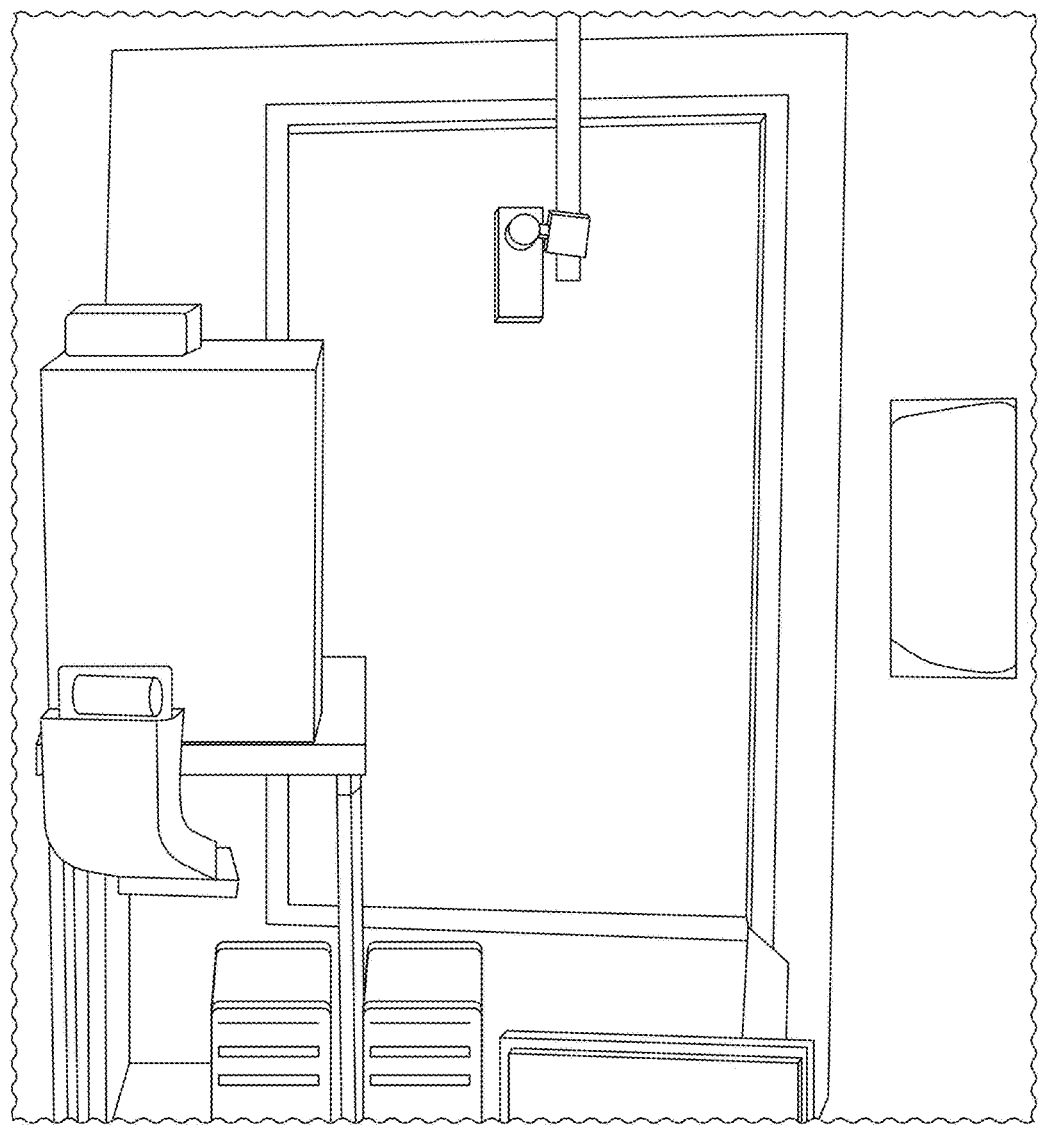
Figure 11:
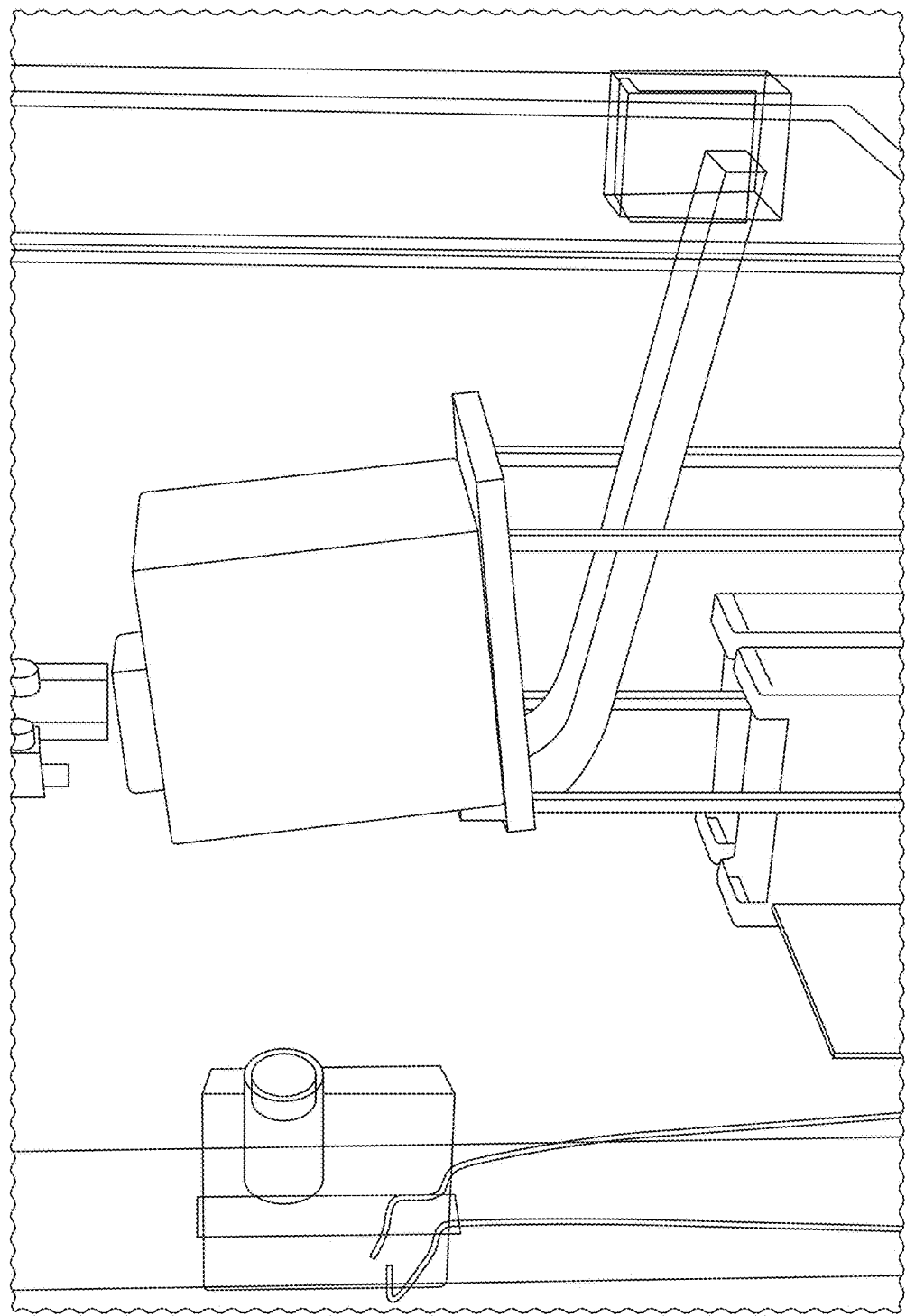
Figure 12:
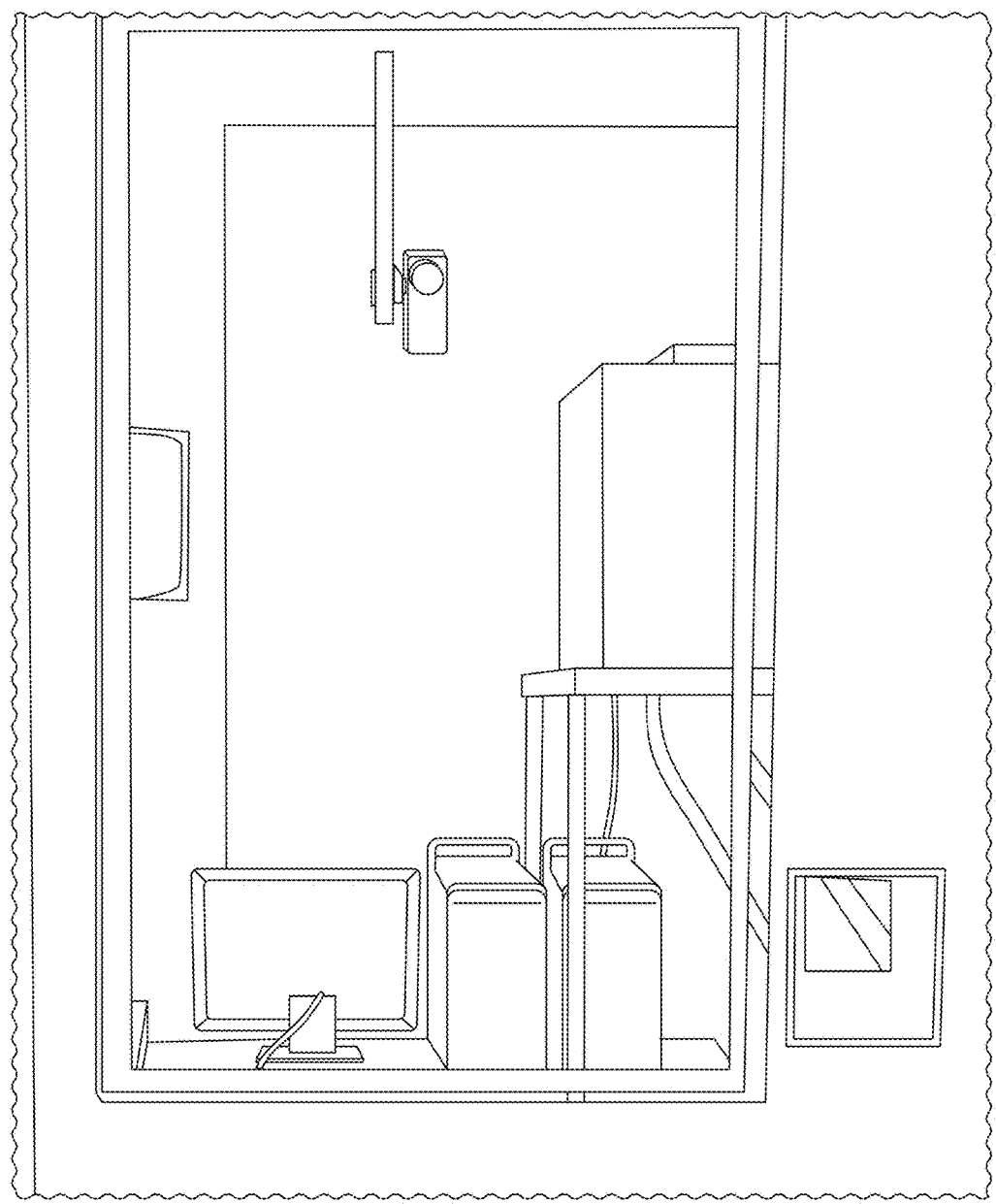
Figure 13:
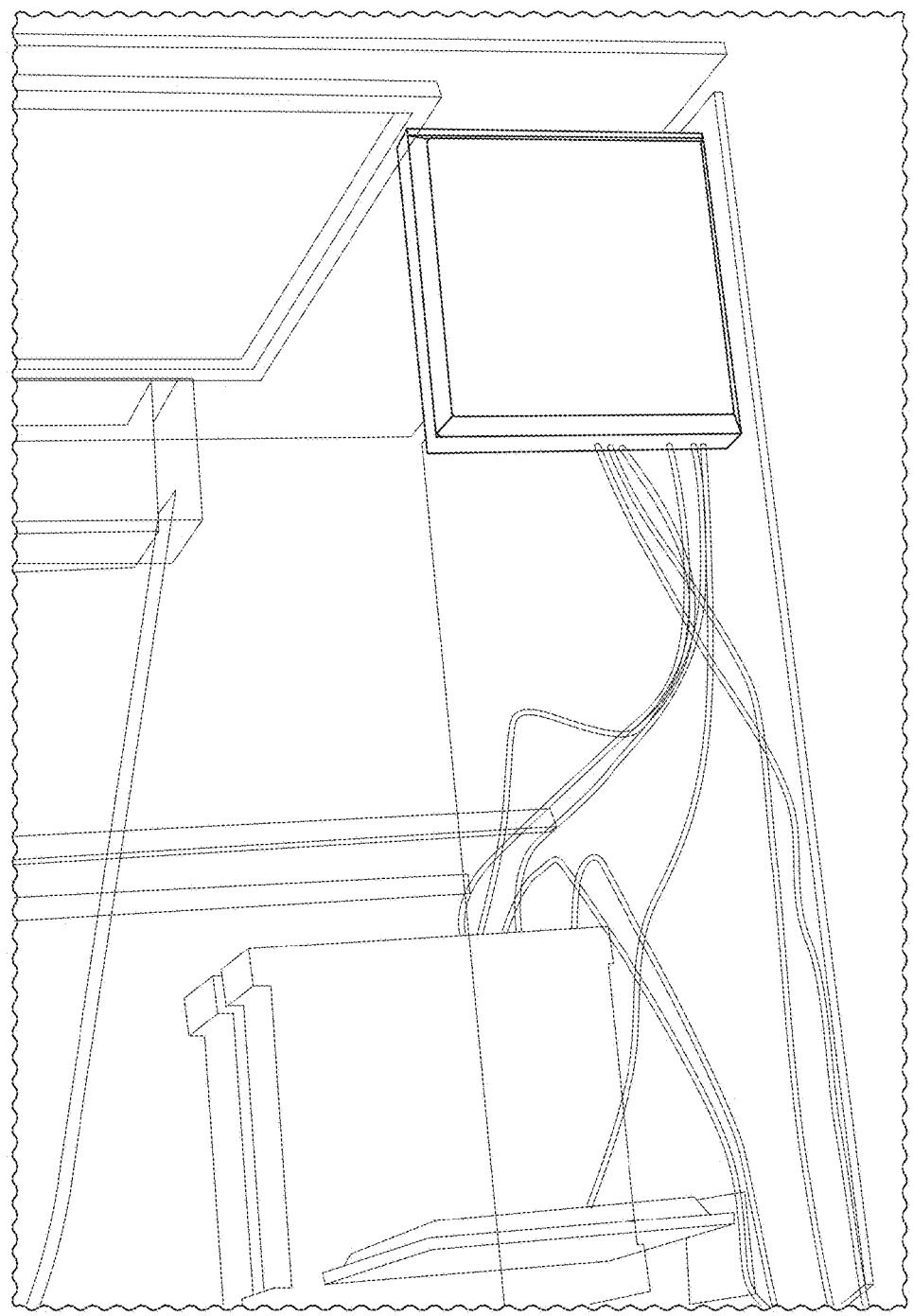
Figure 14:
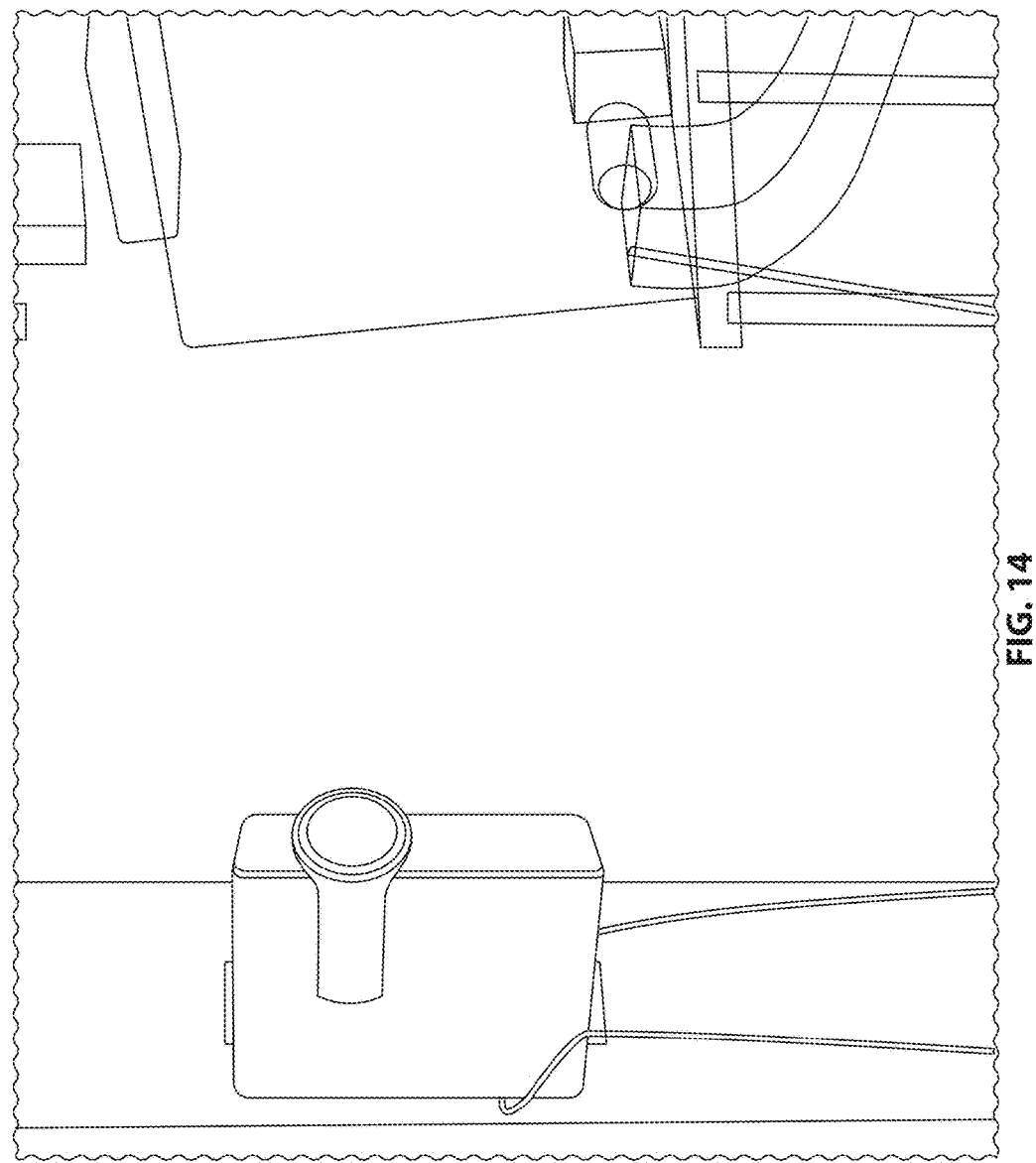
Figure 15:
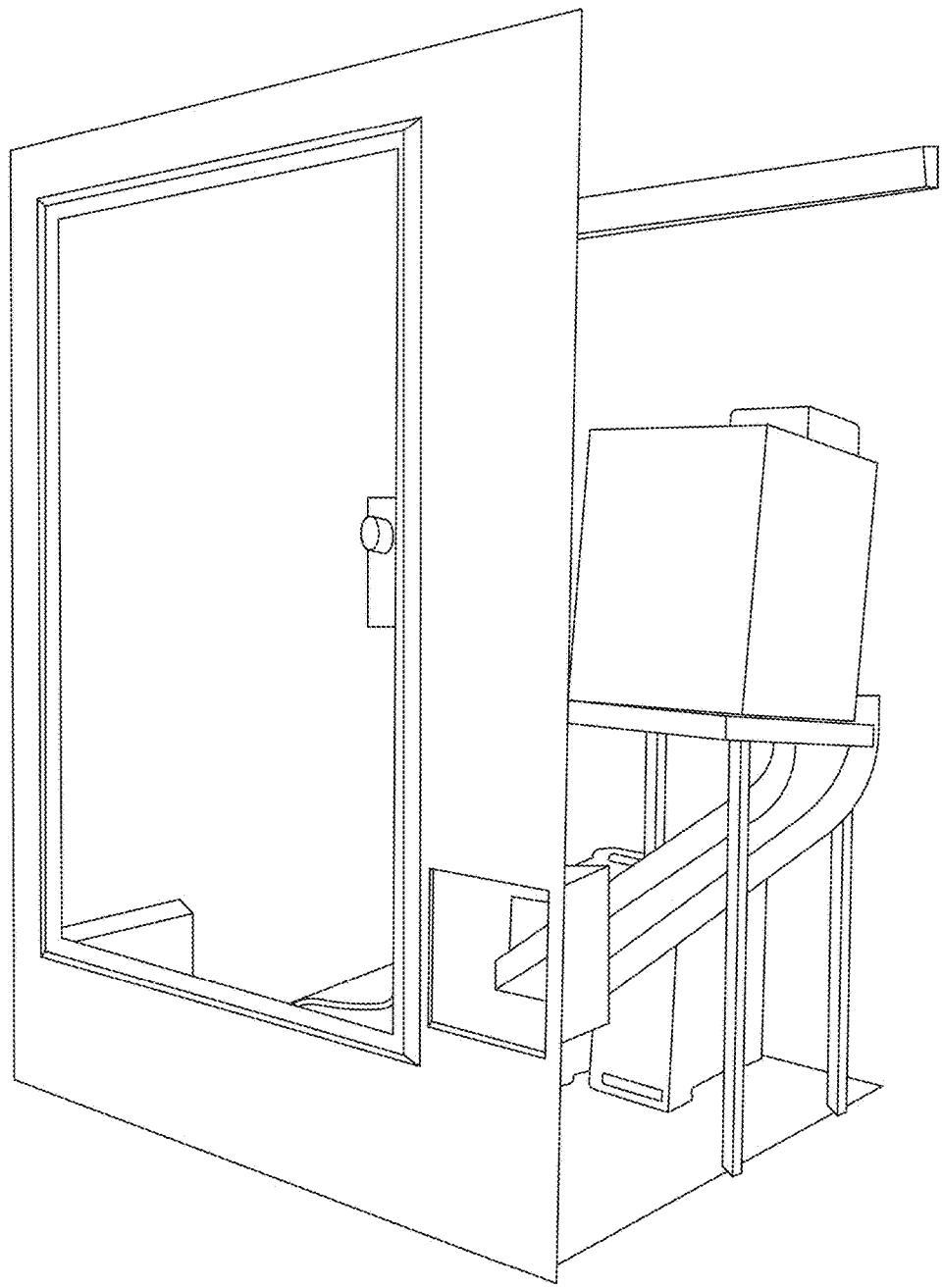
Figure 16:
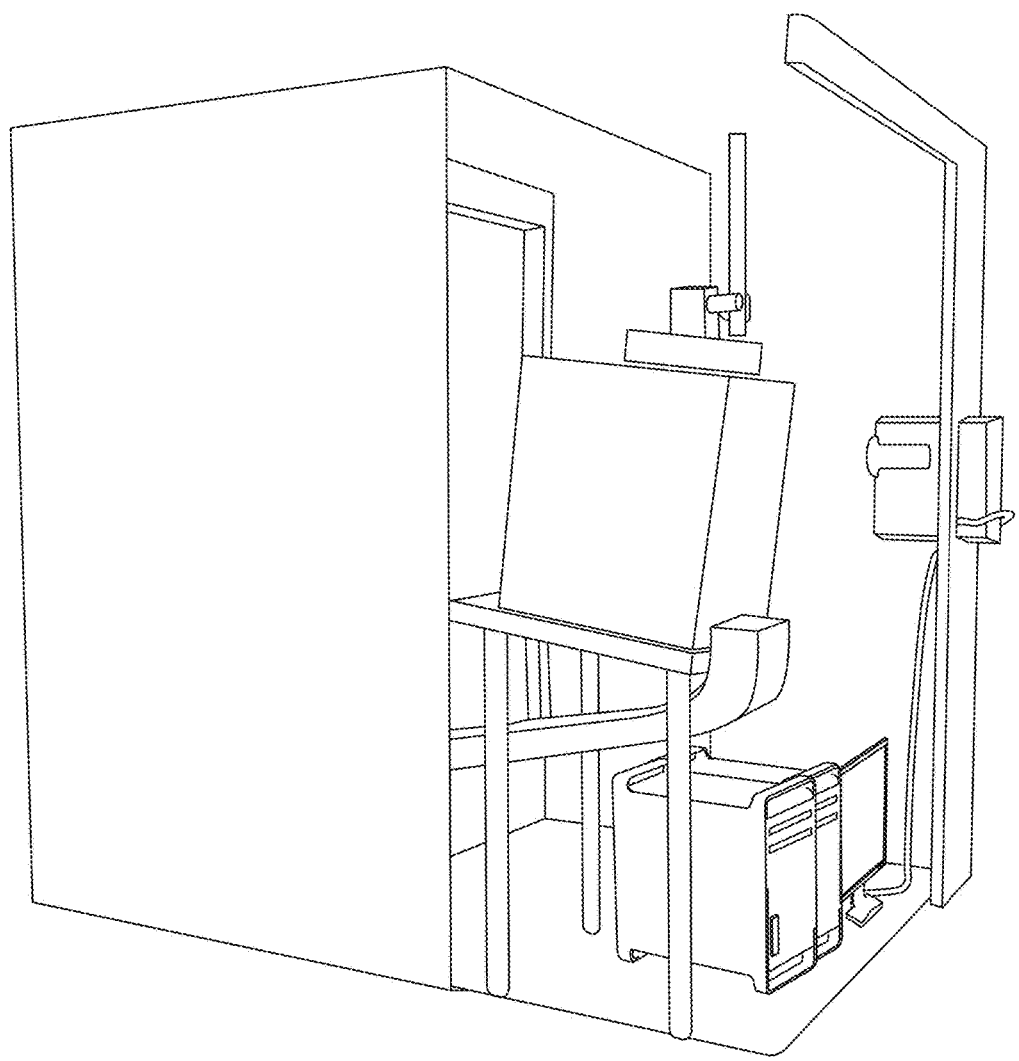
Figure 17:
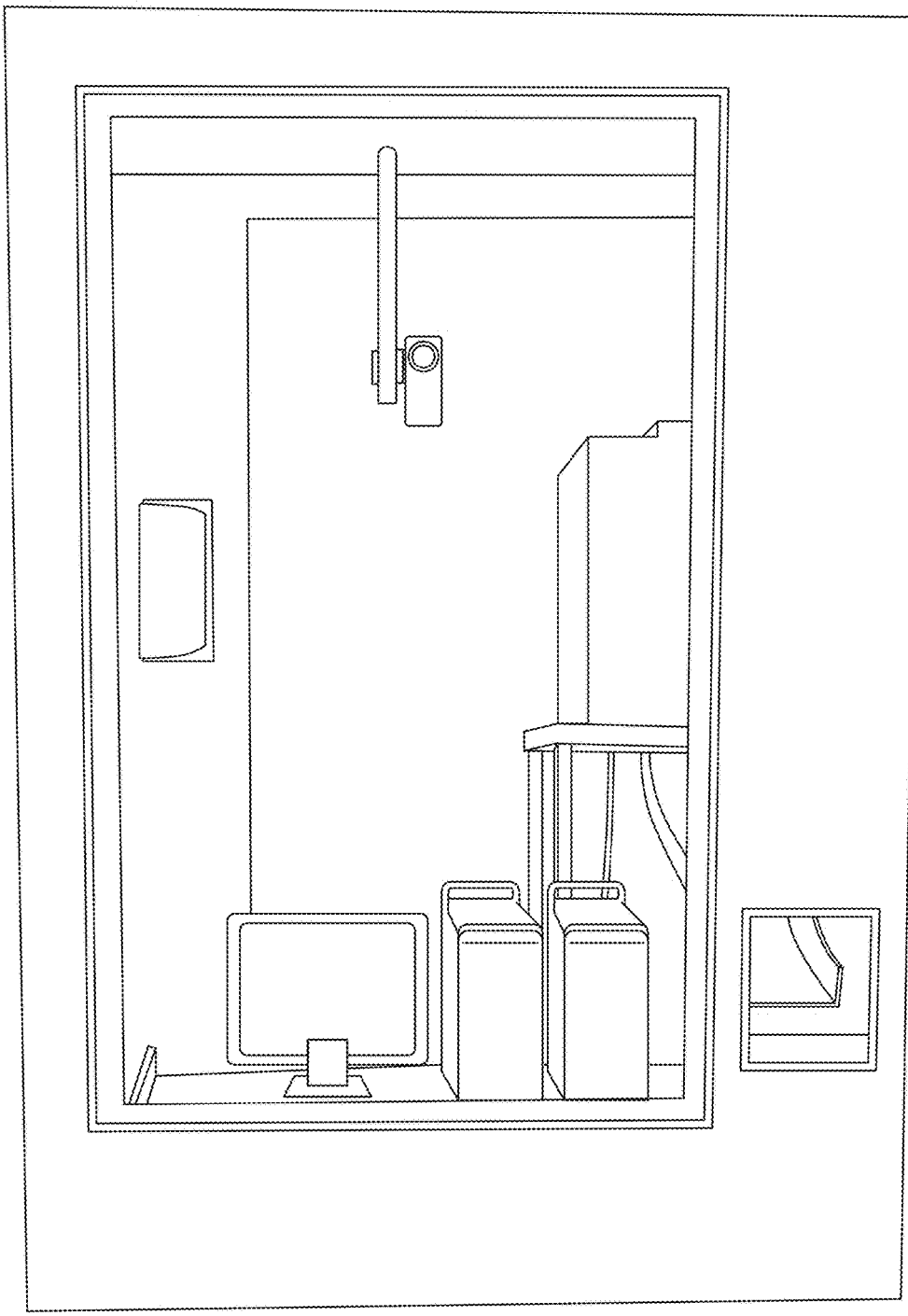
Figure 18:
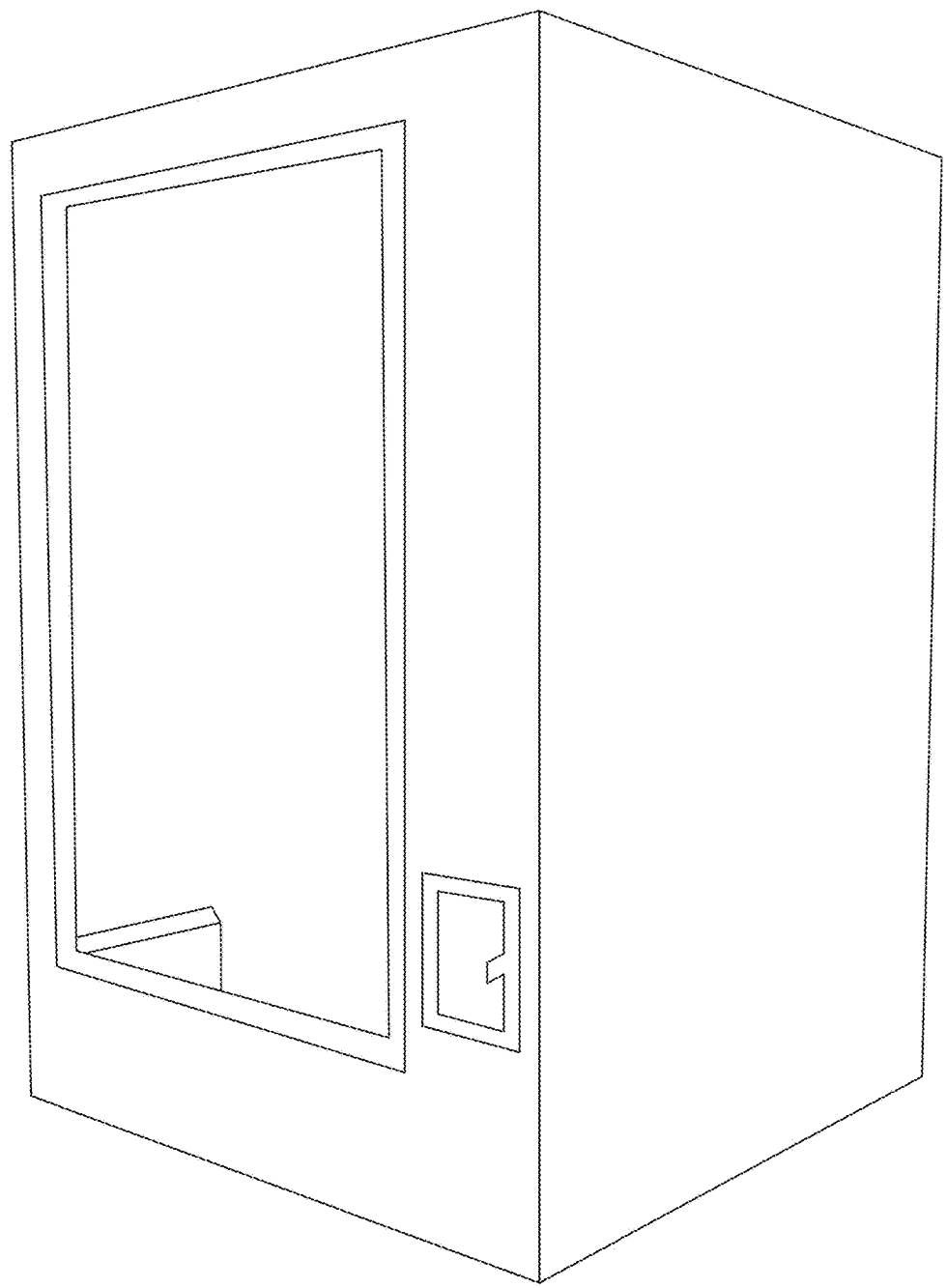
FIGS. 18-20 and 24 are pictorial views showing the apparatus according to exemplary embodiments.
Figure 19:
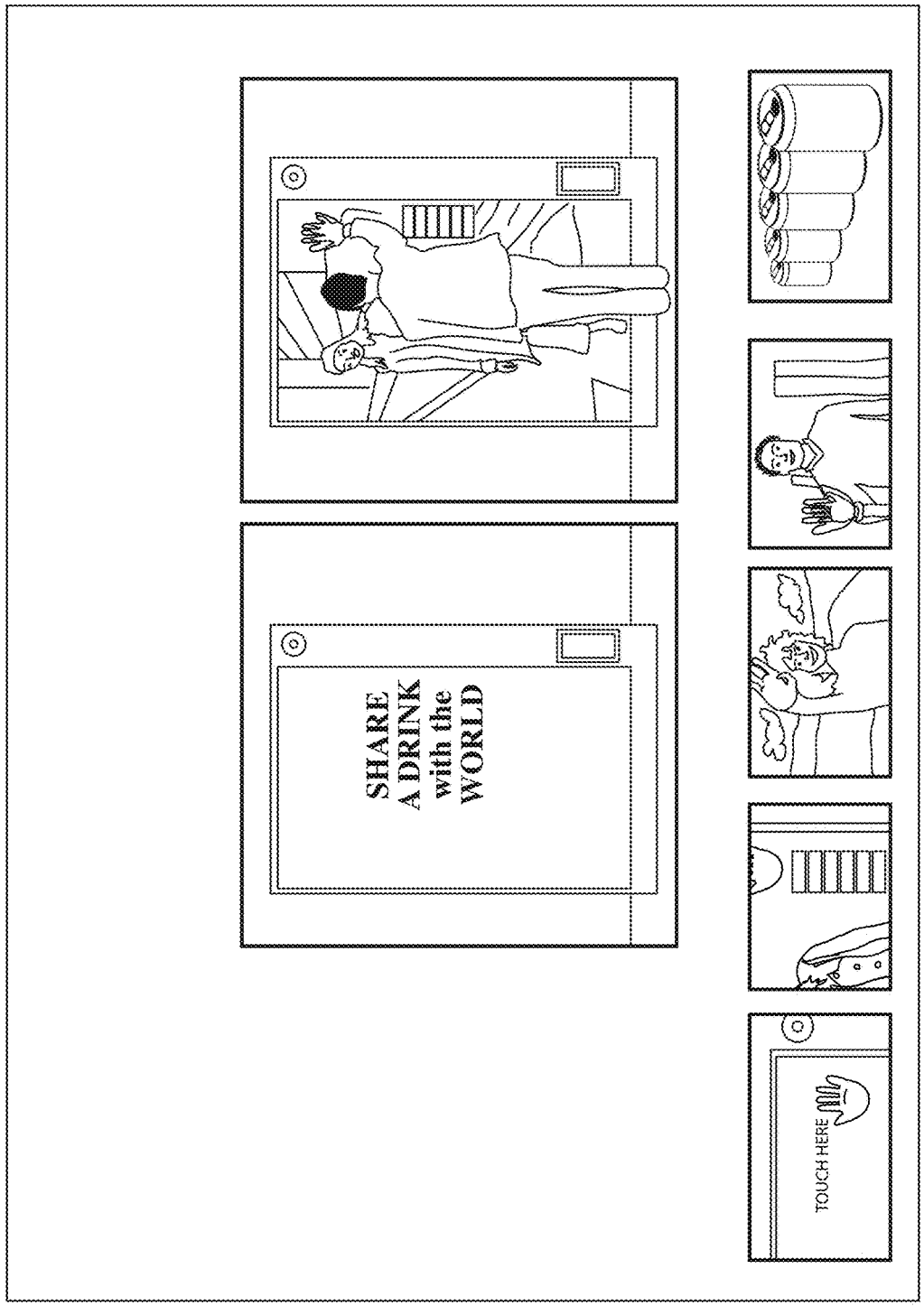
Figure 20:
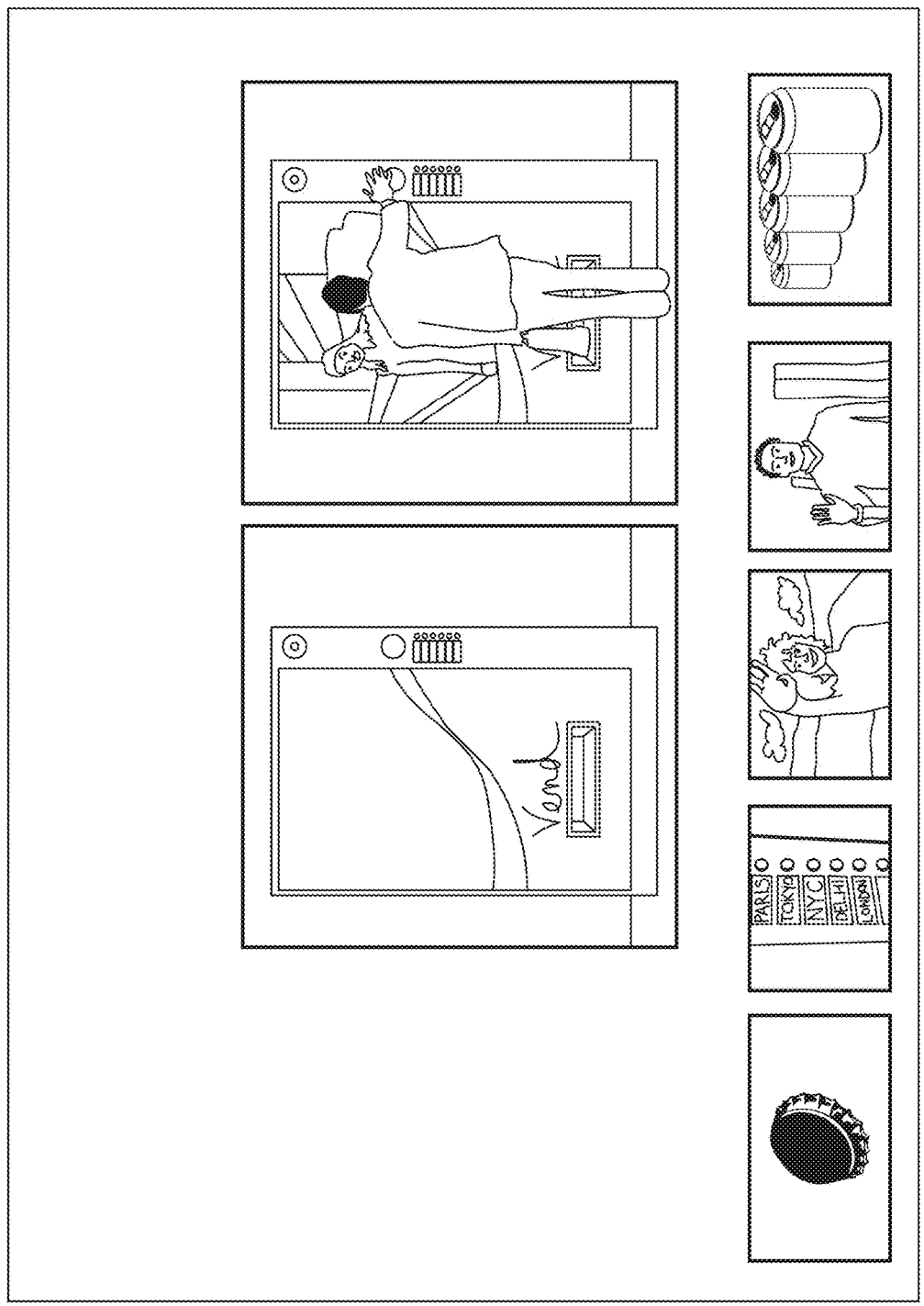

There are various ways for communication between two remote persons to occur, including, for example, the use of voice and video in combination. Conventional video conferencing has been limited to computer devices, such as, for example, mobile devices and large audio visual devices. The use of such services is generally between two parties who have previously planned to meet via video conference and/or have some familiarity with each other and may, for example, be expecting contact from at least one of the other parties. Video conferencing has also been historically been associated with software and/or hardware which may create a price point limiting the possibility of public or free use.

In one exemplary embodiment, the use of point-to-point public communication may be employed with at least one other service and/or good provisioning device and may, for example, allow for the remote communication between at least two individuals. The communication device may be of any size appropriate for allow communication between the at least two individuals and capable of being associated with the service and/or goods device. For example, a screen may range in size from a small wrist sized screen to a large screen which may substantially encompass at least some portion of the service and/or goods device.

Such a device may take any form and provide and/or deliver any number of services and/or goods. For example, a device may provide advertising, news, information, transaction capabilities, such as, for example, banking and bill pay, and/or other forms of communication. Similarly, a device may provide goods, such as, for example, consumable items from vending machine, tickets for an event and/or transportation, certificates, consumer goods, and/or the like. Further, a device may be a kiosk and may, for example, provide free access to a communications device and/or similarly provide information through the use of advertising and other economic tools, such as incentives, to make access to the communication services "free."

In an embodiment on the present invention, at least one communication device may be associated with a vending machine dispensing food items, such as, for example, soda. The communication device may be the size of a small mobile device screen and may preferably be substantially the size of the front of the vending machine. Although a screen may be typically planar with limited to one side of a device, a plurality of screens may be employed to serve the same or disparate functions. Similarly, screens may be of those types known to those skilled in the art such as, for example, curved screens and multi-surface screens. Visuals provided through the device may also be executed through holograms and other less tradition means.

Activation of the communication device may be triggered through a variety of mechanisms and/or triggers. For example, payment and/or dispensing of the service and/or product, such as a soda in the proceeding example, may allow for a user to interact with the communications device. In one exemplary embodiment, the communication device may also be activated by user interaction and/or the presence of the user. For example, and as discussed below, the communication device may be integrated with a touch screen portion, allowing for a user to activate the communication device by touch. Similarly, a motion detector or an infra-red system, for example, may be used to detect the proximity of a potential user and may, for example, initiate at least one alert to draw the attention of a person within a certain proximity of the device.

By way of non-limiting example only, a near infra-red detection array may be included with the present invention and may allow for the detection of a person within a predetermined range of the device, such as, for example, two (2) feet from the device, preferably at least a side allowing for commerce, and may provide a specific distance within the tolerance range of the detector. Other proximity locators and/or activation queues may include, for example, the use of near field communication associated with a mobile device, the use of visual indicia, such as QR codes, SMS, vibration sensors, sound receivers, and the like.

Once activated, a predetermined time limit and/or activation time may be set for various features of the device. For example, communication access may be made available after the purchase and/or dispensing of a good or service and may be provided for a predetermined period of time. In one exemplary embodiment, once something is acquired from a vending machine, the communication device associated with the vending machine may be accessible for a predetermined period of time, such as, for example, three (3) minutes. Although any time may be set, one that allows for a higher number of persons to interact as desired with the communications device is desirable.

A time limit, if one is imposed, may also be variable and/or set in accordance with one or more variables associated with the communications device and/or the vending machine. Such variables may include the amount spend at the vending machine, the number of goods and/or services purchased, the viewing and/or exposure to advertising, and the like. By way of non-limiting example only, a customer of the vending machine may be "rewarded" with an amount of time relationally based on the money spent at the vending machine. Similarly, the watching of an advertisement or other information may provide a certain amount of communications time.

In one exemplary embodiment, the activation of the communications device at a first vending machine device, for example, may provide for activation of a communications device at at least one second vending machine device. In this way, for example, any value necessarily provided by a user of the first device may allow for a second user to respond in kind based on the same value. Of course, as would be apparent to those skilled in the art, the line of communication between devices may always be active and may, for example, provide at least some indication of activity which may be viewed through the at least second device. For example, to draw a user to use and/or activate the communications device on a first device, an image, such as a real-time video feed, may be presented on the communications device of the first device and may, for example, be slightly transparent and/or depixelated to provide less of a display than would otherwise be available during full activation and/or use of the communications device. In this way, an indication may be provided to a potential user that, for example, another user is proximate to the at least second device and/or is ready to or is using the communication device at the at least second device. Although the present invention may come in various forms, shapes and sizes, more detailed embodiments are discussed below.

FIG. 1 and FIGS. 18-20 shows exemplary embodiments of an apparatus 10 which may include a frame 12 to which various components may be mounted. A touch screen panel 20 may be an interactive touch-activatable screen. In exemplary embodiments, the touch screen panel 20 may be on any semi-rigid material, such as, for example, an acrylic and/or acrylic-based material. In exemplary embodiments, the touch screen panel 20 may have at least one infra-red (IR) beam generator associated therewith that emits a grid of IR beams that are used to track hand and finger movement. A touch screen panel may be of any size, as described above, and may preferably be of a standard size, such as, for example, 65 inches in diameter. For example, a 65 inch Screen Tech rear projection screen may be used in conjunction with a 65 inch ZaagTech IR panel and with a 65 inch Screen Solution International IR panel touch screen frame. Using standard sized equipment may help keep costs down and allow for the production of the present invention using primarily off the shelf components.

A screen 24 may be positioned generally co-planar with the touch screen panel 20, and in exemplary embodiments generally overlays the touch screen panel 20. In exemplary embodiments, the screen 24 may be an acrylic material. In exemplary embodiments, the screen 24 may be a polarized acrylic material. The material may be sufficiently transparent so that one can see through it, but still have the ability to hold a clear image. A polarized acrylic material for the screen 24 may allow projected images to be seen at various angles (or a greater off-axis angle in different directions) because of the way that the material holds and distributes light.

A camera 30 may be, in exemplary embodiments, a high definition webcam. The camera 30 may be adjustably mounted on a post 32 to the frame 12. Although not shown, post 32 may extend along the full height of the screen 24. The camera 30 has a lens 34. One lens 36, such as that used in a pair of active shutter "3D" (three dimensional), may be placed over the webcam lens 34. "Active shutter" is also known in the art as "alternate frame sequencing" or "alternate image." The lens 36 may contain a liquid crystal layer sandwiched between two transparent outside layers. The liquid crystal layer may become opaque when voltage is applied, being otherwise transparent. The lens 36 may be controlled by a timing signal that may rapidly apply and unapply voltage to the lens 36 so that the lens 36 switches between transparent and opaque. The lens 36 only "sees" the black (opaque) frames that are projected (as discussed further hereinbelow), not the frames with the video feed and any animation. This allows the webcam to "see" through the projected image that the user is seeing. Such a technique may reduce or eliminate "ghosting" of the image(s) and may reduce any noticeable "flicker." Similarly, as discussed herein, a plurality of cameras may be used to enhance image quality, provide various angles of views, and to provide a fail-safe if at least one camera were to fail, for example.

In one exemplary embodiment, a portion of code, such as, but not limited to, the following, may be employed to alternate between opaque and non-opaque screen presentations:

```
import flash.events.Event;
addEventListener(Event.ENTER_FRAME, onEnterFrame);
//seeThrough is the black frame that is enabled or disabled every other frame to replace the
video image
    var evenOdd:uint = 1; //determines if we are on an odd or even frame.
    function onEnterFrame(e:Event) {
        if (evenOdd == 1) {
            evenOdd = 2;
            seeThrough.visible = false;
        } else {
            evenOdd = 1;
            seeThrough.visible = true;
        }
    }
}
```

As would be appreciated by those skilled in the art, the alternating of frames may allow for the human eye to be tricked into seeing what appears to be a steady-state image when the image is being projected at less than a full amount of possible frames per second. For example, the human eye generally perceives 30 frames per second as a steady-state image. High definition and other related standards allow for the projection of images at a rate of 60 to 120 frames per second. In one exemplary embodiment, a rate of less than 60 frames a sec, but greater than 30 frames a second, may be employed to allow for the alternating of at least one projected image to allow for at least one camera placed behind screen panel 20 to collect at least 30 frames per second of video for display at another, preferably remote, screen.

In exemplary embodiments an optional dispensing (or vending) apparatus 40 (akin to the device discussed above) may be associated with the apparatus 10 and in exemplary embodiments may be disposed inside the apparatus 10. In one exemplary embodiment a dispensing apparatus 40 may be a refrigerated soda can vending machine available from Koolatron (Ontario, Canada) that has been modified by associating a micro-controller 42 (available from Arduino) therewith to control the dispensing apparatus 40, such as, but not limited to, dispensing cans of beverages or other objects. The dispensing apparatus 40 may include a compartment 44 that may hold a number of dispensable objects 46, and a conduit member 48 for conducting an object 46 from the compartment 44 to a dispensing outlet area 49. In other exemplary embodiments, alternative dispensing apparatus known to those of ordinary skill in the art may be utilized, whether or not cooled, heated or room temperature, and to which a micro-controller 42 can be associated. The micro-controller 42 is in electronic communication (wired, wireless or otherwise) with a central processing unit (as described herein below).

A projector 50 may be mounted to frame 12. In exemplary embodiments, the projector 50 may be a short throw projector. In exemplary embodiments, the projector 50 may be a "3D" projector. In exemplary embodiments, the projector 50 may project video at 60 frames per second (though other rates may be used as would be appreciated by those skilled in the art). The projector 50 may project side-by-side or top-bottom 3D images onto the screen 24. The projector 50 synchronizes with the lens 36 to allow the camera 30 to detect recordable images through the screen 24.

In one exemplary embodiment, a portion of code, such as, but not limited to, the following Actionscript 3, may be employed to handle image rotation and top-bottom 3D mode:

```
stream_name = String(stream_name);
iStream = new NetStream(nc);
iVideo = new Video(1280, 720);
```

-continued

```
iStream.play(stream_name, "live");
iVideo.attachNetStream(iStream);
stageMC.addChild(iVideo);
iVideo.y = 1280;
iVideo.x = 720;
iVideo.rotation = 90;
iVideo.scaleX = -1;
private function init( ):void {
    arduino = new ArduinoInterface(10);
    stageMC = new MovieClip( );
    stageMC.x = 0;
    stageMC.rotation = -90;
    stageMC.y = 720;
    addChild(stageMC);
    stage.addEventListener(Event.ENTER_FRAME, enterFrameLoop);
    activityLoader = new Loader( );
    loadData( );
    setupDemo( );
    topBottom3dMode( );
}
private function topBottom3dMode( ):void {
    stageMC.scaleX = .5;
    stageMC.y = 360;
}
private function onReceiveCommand(e:NetConnectionClientEvent) {
    var command: String = e.infoObject.command;
    loadActivity(command);
}
```

A first central processing unit 60 is an encoding unit (and referred to as the "encoding computer 60"). The encoding computer 60 is in electronic communication with the camera 30, such as, but not limited to, a wired or wireless connection. The encoding computer 60 has a central processing unit, memory storage, and other components typical of a personal computer. The encoding computer 60 may receive and store information of the user, adjust the picture quality, compress a data feed, stream video to a remotely located server 70 (for example, a flash media server).

A second central processing unit 80 may handle the interactions with various components (and is also referred to as the front end computer 80). The front end computer 80 is in electronic communication with the dispensing apparatus 40, touch screen panel 20 and projector 50. The front end computer 80 handles the actuation of the touch screen panel 20, image projection and dispensing of objects 46. As would be appreciated by those skilled in the art, both first central processing unit 60 and second central processing unit 80 may be housed in the same unit and may, for example, share the same microprocessor.

In exemplary embodiments an optional uninterrupted power supply (battery backup) 90 may be incorporated and various components are plugged into the supply 90 to allow for operation (at least temporarily) in the event of a loss of power.

In exemplary embodiments the apparatus 10 may have an internet connection component 95 (not shown, but which may be built into computer 60 or 80) for transmitting and receiving information to and from the internet, such as, but not limited to, a connection via direct wire, Wi-Fi, satellite, cable, cell phone, or the like.

In exemplary embodiments, a housing 100 is provided in which the apparatus 10 may be contained. The housing 100 may be of any durable material and may be, for example, a combination of plastics and lightweight metals. Housing 100 may be suitably weather-proof to allow for the outdoor use and storage on apparatus 10 and may provide at least some insulating properties to limit extreme temperatures shifts which may be otherwise experienced by apparatus 10 within housing 100.

Figure 21:
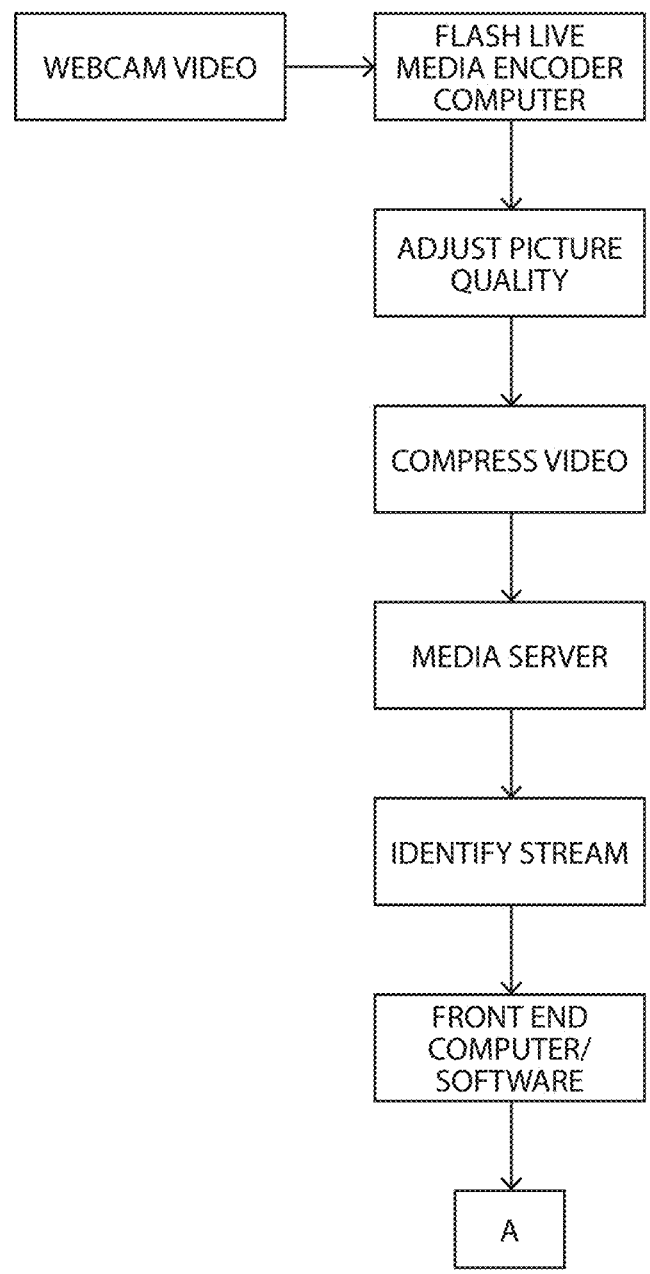
FIG. 21-23 are flow diagrams showing exemplary embodiments of methods of the present disclosure.
Figure 22:
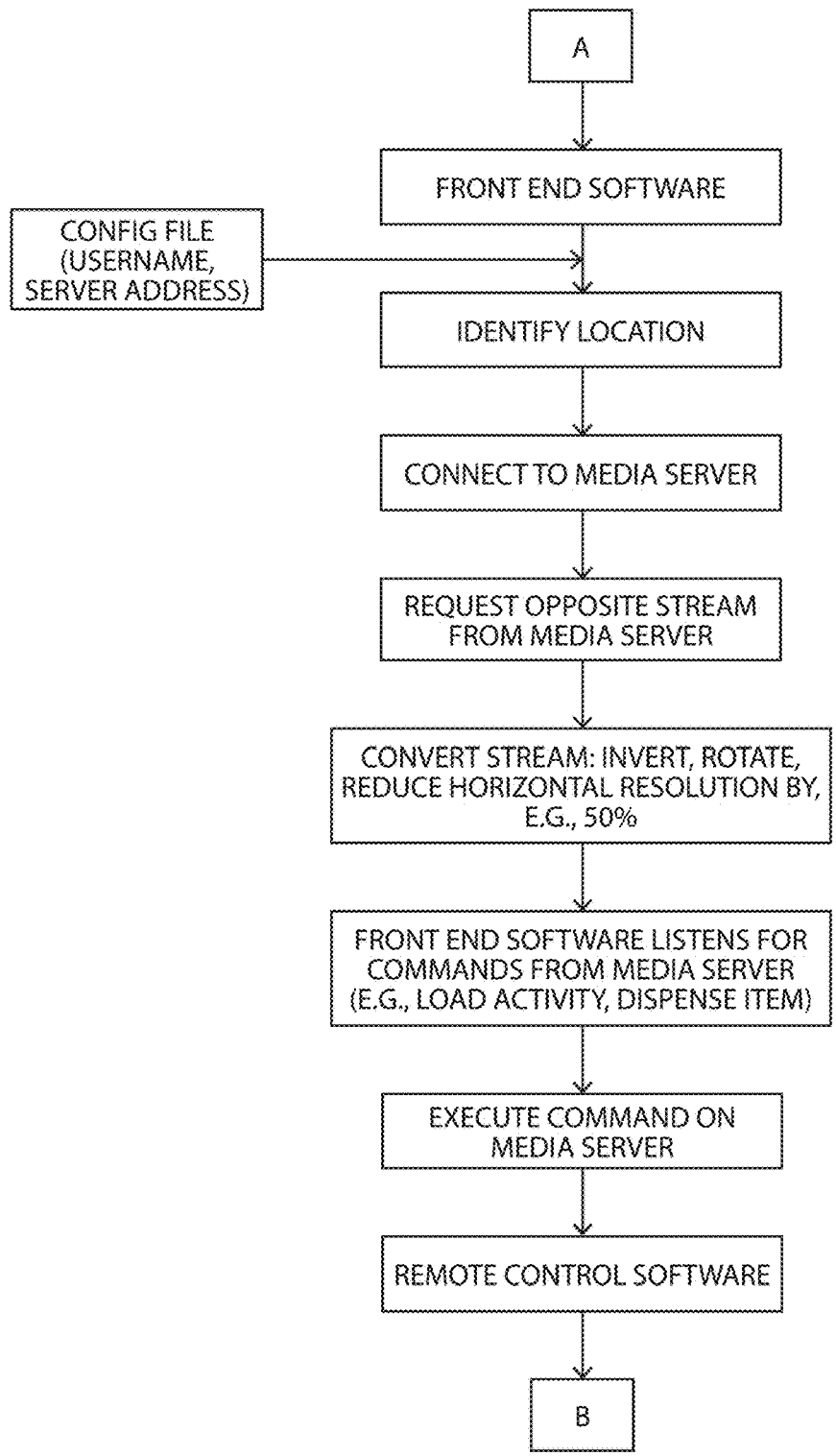
Figure 23:
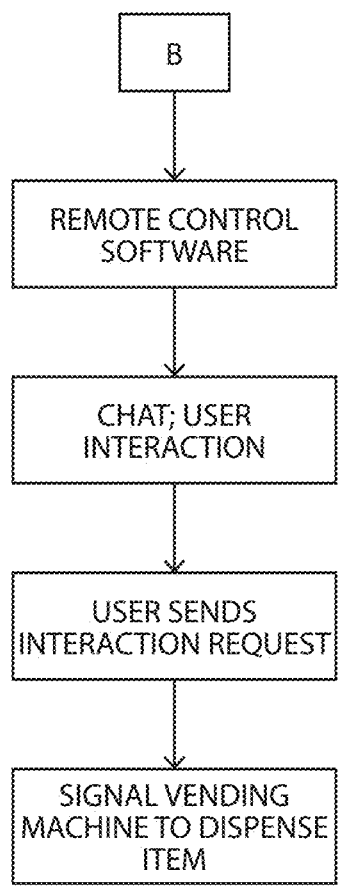
Figure 24:
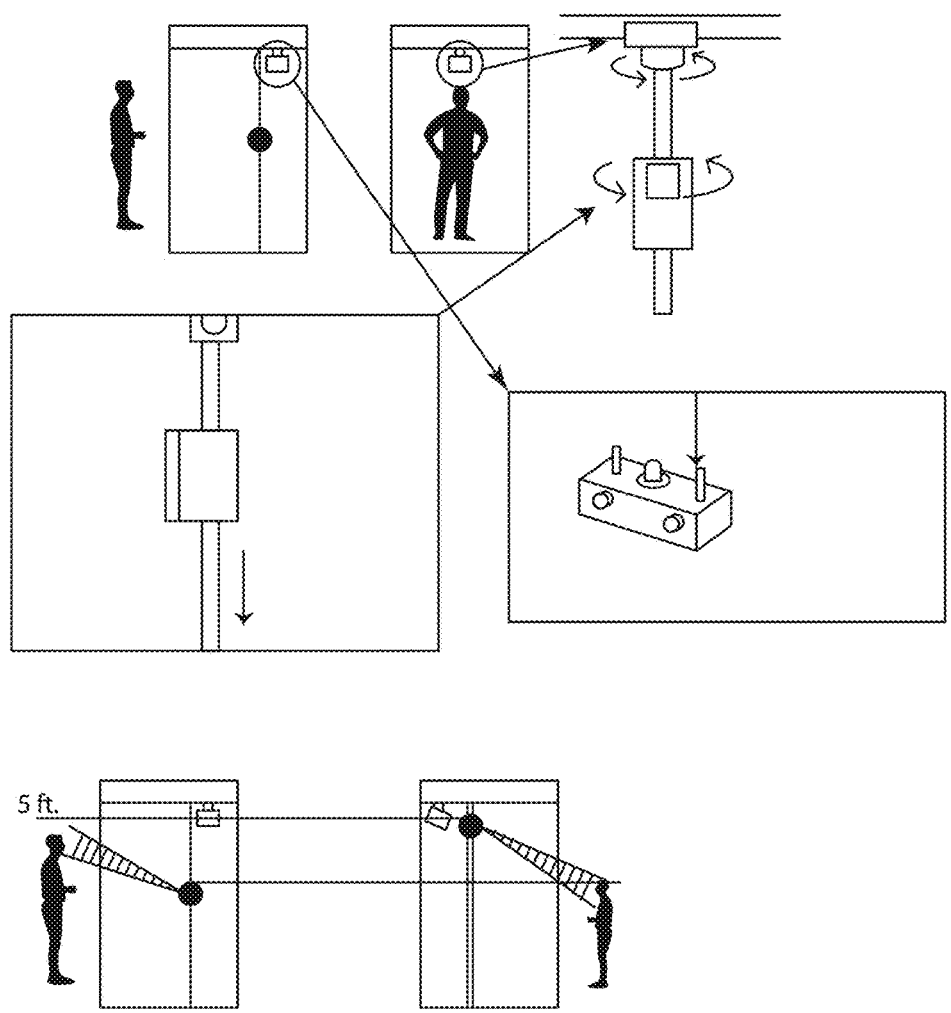

The following describes one exemplary embodiment of a method using the apparatus 10 as shown in the flow diagrams in FIGS. 21-23.

A first apparatus 10 unit (referred to as unit 10A) may be set up in a first geographic location. A second apparatus 10 unit (referred to as unit 10B) may be set up in a second geographic location, which may be nearby or in different parts of the world. An internet connection may be used to place the units 10A and 10B in communication. The units 10A and 10B may interact to allow a user of each unit to interact with each other in a virtual manner. It is to be understood that many apparatus 10 units may be set up around the world in various locations, each unit in communication either directly with the other units, or with the server 70, for example.

The camera 30 may be in electronic communication with the encoder computer 60. When actuated, the camera 30 can record video of a user U-A standing in front of the touch screen panel 20 of one of the apparatus 10 units. The apparatus unit 10B may record the video of a user U-B standing at the unit 10B. The recorded video may be encoded by the encoding computer 60, such as, but not limited to, using Flash Media Live Encoder.

In exemplary embodiments, the picture quality of video from the camera 30 may be adjusted by the front end computer 80 software to make up for lighting conditions, shutter speed and other factors. In exemplary embodiments, the video may then be compressed, such as, but not limited to, by using vp6 compression software. The compressed signal may then transmitted (from an apparatus unit 10A) to the server 70.

The server 70 software may read a configuration file (which may contain, among other data, the server address and username) and identifies the compressed video stream as coming from an apparatus unit 10 in a given location. The software requests the video stream from the "opposite" location (i.e., the location with which the apparatus unit 10A is in communication) from the server 70.

The front end computer 80 can receive (for example, buy pulling) a video stream of the user U-B standing at apparatus unit 10B from the server 70. The front end computer 80 software can invert, rotate and reduce by (for example) half the resolution of the video stream. The video stream now takes up the top half of the screen 24, leaving the bottom half black. This prepares the screen 24 to be projected using the projector 50. In one exemplary embodiment a top-bottom projector 50 is used. In another exemplary embodiment a side-by-side projector 50 can be used so as to divide the screen into left/right areas. In one exemplary embodiment, a plurality of projectors may be used to project more than one image, such as at least two distinct images and/or a single hologram-type image. The front end computer 80 software may wait for and may receive commands from the server 70, such as, but not limited to, commands to load an activity or to actuate the dispensing apparatus 40.

The projector 50 may rear-project the video from the user U-A onto screen 24, which may be seen by the user U-B standing proximate to unit 10B. Accordingly, the user U-A may see at apparatus unit 10A streaming video of a remote user U-B projected onto (and through) the screen 24, while the user U-B can see streaming video of user U-A at apparatus unit 10B. It is to be understood that in exemplary embodiments, audio can also be streamed by using a microphone 120 incorporated with the apparatus 10 which records a user's voice (or other sounds) and is processed and streamed with the video feed.

In exemplary embodiments remote control software connects to the server 70 and allows the users U-A and U-B to talk with each other or with other people at other locations. In exemplary embodiments the users may use their respective touch screen panel 20 to enter text on a keypad to allow the users to "chat," similar to instant messaging (SMS). In exemplary embodiments an operator in control of remote control software can send interaction requests to a given apparatus unit 10 to actuate the dispensing apparatus 40 to dispense an object 46. As would be appreciated by those skilled in the art, the server 70 may allow for access to and from third party social network platforms and may allow, for example, real-time tweeting and/or posting of contact between users U-A, U-B, and/or third parties.

In one exemplary embodiment of a user experience in which various apparatus 10 units are deployed in different locations, a user U-A may approach apparatus unit 10A and may place his/her hand on the touch screen panel 20, such as by placing his/her hand on the outline of a hand that is on the touch screen panel 20, for example. Touching the screen, for example, may initiate the process. A user may also be requested to log in, for example. The touch screen panel 20 may display a list of apparatus 10 unit locations (referred to for convenience as alpha, beta, gamma, etc.). The list of locations can highlight or otherwise indicate whether there is a user present at any other location at the moment. If there is at least one location identified, the user U-A (at location alpha) selects a location (for example, location beta) by touching the location indicated on the touch screen panel 20. A connection may be made between the apparatus unit 10A at location alpha and the apparatus unit 10B at location beta. The user U-B at location beta may see and, optionally, hear, the user U-A at location alpha, and vice versa, by means of the projected video stream from the opposite unit. The users U-A and U-B can thus see each other's image projected onto the screen 24 and may communicate with each other.

In exemplary embodiments each user U-A and U-B may place a hand on the outline of the hand on the touch screen panel 20. When both hands are touching their respective touch screen panel 20, the front end computer 80 in apparatus unit 10A signals the dispensing apparatus 40 to dispense an object, such as, but not limited to, a chilled can of a beverage, which is conveyed to the outlet area 49 where the user U-A can receive and enjoy the beverage. Similarly, the front end computer 80 in apparatus unit 10B signals the dispensing apparatus 40 to dispense a beverage can which the user U-B can receive and enjoy.

In one exemplary embodiment, a portion of code, such as the following Actionscript 3, may be employed to handle the dispensing of objects:

```
private function onReceiveBeverage(e:NetConnectionClientEvent) {
    if(arduino.pinNumber == 10) {
        arduino.pinNumber = 11;
    } else {
        arduino.pinNumber = 10;
    }
    arduino.sendBeverage( );
    trace("received beverage command from server");
}
```

In an exemplary embodiment the dispensing apparatus 40 may hold cans with labels printed in the language commonly associated with, for example, locations alpha, beta, gamma, and the like, so that a user U-A can receive a can with a label printed in the local language of user U-B in location beta. In this way, two people in very different locations around the world can each enjoy a beverage "from" (i.e., printed with the label from his/her new friend's country) the land of the other, thus creating a shared interactive experience.

The following discussion presents alternative exemplary embodiments.

Eye-to-Eye Videoconferencing Solution

The images of conference participants may be projected onto a curved screen. This addition would give the ability to see multiple people sitting in the same room. The projector and camera would be placed on a motorized platform that would detect audio and rotate automatically to the person speaking.

In one exemplary embodiment, a plurality of projectors may be used with at least one transparent holographic screen, as described above, to allow for a virtual "eye-to-eye" video conference experience. One projector would be used for multiple conference participants. Projector mapping is employed to split the image. Conference participants could be filmed in front of a green screen thereby allowing custom background choice. One could also use the technique of pixel comparison where the user steps out of the background and then steps back in thereby allowing software to substitute the background on the fly. This approach does not require a green screen.

This approach would also require the use of the flash media server. A custom lighted set up would also be needed to make the images look sharp. In exemplary embodiments the system would be a package potential interested parties provide. This is a system and not just a single piece of equipment that would be purchased.

Eye-to-Eye Interactive Signage

Using the same projector, camera, and transparent holographic rear projection screen as described hereinabove, the system may be set up behind a common lighted sign (like one would see in a subway station). Audio and voice elements may be incorporated as well using known hardware elements. An infrared touchscreen frame may be included and users may be allowed to control elements of an interactive experience. This exemplary embodiment could also include the pixel comparison approach and allow custom backgrounds to be displayed.

By way of non-limiting example only, a sign may state "picture yourself in Hawaii"; and as a person nears the sign, it would look like the person(s) were walking on a beach in Hawaii. The sign may then allow for the person to directly connect with a live travel agent and make a booking in real time through the sign and/or receive and/or exchange information. Such a sign could enable fully interactive web ports where bookings and hotel shopping, for example, could occur right in real time.

As one skilled in the art could appreciate, the information displayed may be altered depending on location, time and any demographic information which may be gathered prior to interaction with at least one user. Staying with the subway sign example, if the sign was in a subway car, the location of the subway car in a particular neighborhood or city section may allow for ads or information relevant to a particular economic and/or ethnic class of riders, for example. Similarly, the sign may take into account weather conditions such that the Hawaii example provided above is displayed when it is snowing in the location of the sign, versus selling umbrellas when it is raining.

When using the present apparatus and method with signage, some data may not need to be transmitted to another location, allowing frame sequential 3-D to be used, thereby allowing for a brighter, higher-resolution image and a more active sign.

Interactive Mirror

In one exemplary embodiment, a person standing in front of a mirror may see an eye-to-eye version of themselves and may manipulate the images that may be associated with themselves, such as, for example, clothing and/or jewelry. For example, the present invention may allow for the insertion of items of clothing as an overlay and/or substitution on the image of the user so as to recommend alternative clothing options other than what the user is wearing.

In exemplary embodiments, the apparatus may also keep a running price count of the items that the user has virtually and actually tried on and may allow the user to interactively choose items to purchase. A software layer may be incorporated to allow a user to connect to remote device, for example, to allow a third person to see what outfits the user is looking at and provide feedback to the user. In this way, the third party may be provided access to the virtually dressed user and or an actual image of the user. Any images created and/or captured by the present invention may be posted to a desired social network and shared socially. Such an "interactive fashion mirror" could also facilitate fashion contests between locations of the same brand store.

As discussed above, this aspect may be both a commercial and home offering by allowing mobile and home PC platforms to capture a suitable image of a user and create a virtual composite of the user using the "green screen" principles discussed hereinabove.

Encounters

In one exemplary embodiment, a user may virtually share a meal with someone in a different location, such as a different country, for example, and may initiate that meal as a kiosk located at a restaurant table, for example.

In one exemplary embodiment, two parties may witness each other signing an agreement with increased clarity and "eye-to-eye" contact.

In one exemplary embodiment, health care providers may be able to see their patient virtually in real time and instruct the patient to move or do some act that might produce a visible or audible response that could help diagnose a condition. The ability for the present invention to track the movement of a patient's head and to adjust the camera angle to maintain, as best as possible, the "eye-to-eye" feel, may make the patient more comfortable, may provide the ability to examine in a less cumbersome manner, and may provide for clearer instruction from each of the examiner and the examinee.

In one exemplary embodiment, teachers and students may connect with each other from remote locations with much greater interaction. Importantly, younger students may need to have the ability to view a teacher head long (eye-to-eye)

to stay connect with the lecture and or other teaching. Similarly, colleagues may collaborate remotely using the touch screen to draw on or project images or embedded videos.

Full Spectrum Classroom Connection

In one exemplary embodiment, two (or more) classrooms with a larger display may be connected and allow for a more "in-person" feel. A larger apparatus may be positioned further away from the subject than in other embodiments, so that the main subject can see an entire classroom of students (or colleagues). Providing eye-to-eye perspective correction allows participants more direct visual interaction than in previous video-conferencing solutions. A student raising his or her hand, for example, may be seen at the same angle by a remote instructor, and similarly, the instructor can point in the direction of the student to call on them in a more natural fashion.

As would be appreciated by those skilled in the art, multiple screens and/or cameras may be employed in accordance with the size of the venue. For example, in a large collegiate setting, several screens, preferably curved, to allow for each of those in the class to be viewed by at least one of a plurality of cameras employed with the screens to enable the relative "eye-to-eye" contact with the lecture and a student in various parts of the lecture hall.

Multiple Projectors

In an exemplary embodiment, a second projector 50A (or multiple projectors) may be incorporated in the apparatus 10 that may project a pre-recorded video or still image, such as a video clip of a surgery that the student can see projected onto the screen 30 while the teacher is discussing the same video clip from a remote location. The projector 50A can project a video stream or still image onto a portion of the screen 30 leaving sufficient room for the rest of the video stream of the virtual user.

Active shutter 3-D technology may allow the system to project at least two images at once and present one view to the camera to see one image and the person standing in front of the machine to see another.

Video Conferencing

In an exemplary embodiment, multiple projectors may be used to project different video streams onto portions of the screen 30. In this manner a video conference involving a number of people may be held. As discussed above relative to a lecture hall setting, a screen may be employed that provides sufficient room for a camera to maneuver to sufficiently track to at least one person on the conference call. As discussed herein, the movement of the at least one camera may allow for a more seamless and more "live" video conferencing experience.

Embodiment for Head Tracking

In an exemplary embodiment, the apparatus 10 may be adapted to track the movement of a user, such as a user's head. For example, a father and son may each be in front of their individual apparatus 10 and accompanying screen 30. The son is much shorter so the father has to bend down to see him. With the current machines, the son's screen would not show the father's eyes. With an apparatus 10 adapted as described, the web cam 30 moves with the father's head so that the head is always eye level.

In an exemplary embodiment, a Microsoft® Xbox® Kinect® unit is incorporated in the apparatus 10 to track a user's head position, such as by tracking eye movement. It is to be understood that other movement detecting systems can be used. In an exemplary embodiment, the Kinect sensor unit may be placed on the front panel at the top of the apparatus 10. In such an embodiment a second active shutter lens 36A is place over the lens or lenses of the Kinect sensor unit. The camera 30 is associated with a servo-controlled platform that can raise and lower and also swivel. The information from the head tracking will be sent to the other apparatus 10, and the camera will move accordingly. This will provide the correct eye contact no matter what height the user is. This will also allow the user to look to the sides of the other user. This will display some of the inside of the machine.

Telepresence Document Authentication

In an alternative exemplary embodiment, fingerprint recognition and retina scanning hardware may be incorporated in the apparatus as an additional measure for user authentication. Multiple parties may witness the digital signing of documents using biometric technology, with the additional reassurance of direct eye-to-eye contact.

In one exemplary embodiment, such biometric identification may be accomplished using the tracking software and hardware discussed herein and may be of use in multi-person communications. For example, during a video conference, although a camera may automatically detect and focus on an individual talking, biometric identification may allow for the identity of the speaker to be recorded and/or shared with the other participants.

By way of non-limiting example only, during a multi-person video conference, a database containing at least a portion of a participant's identifiable biometric features, may be accessed to provide to the other participants an identifier associated with the identified person. Such biometrically identifiable features include, for example, a person's left nostril, fingerprint, optic dimensions, voice frequency and/or pitch, height, and/or other facial features and would be known to those skilled in the art to be readily identifiable by a computer assisted scanning device.

In one exemplary embodiment, such biometric identifiers may be independently verified and/or remotely held to provide to each party some assurance that the subsequently provided identifier is correct. In this way, understandings and, for example, legally binding agreements may be consummated between the parties. For example, a licensing agreement between two technology companies in two remote countries may be "signed" by providing verification of identity. In addition, the use of such identification may be used through the presently disclosed apparatus and/or method and may, for example, be used to identify those in a classroom setting, alerting the lecturer to who is speaking and/or has a hand raised, and/or identify an authorized user of an embodiment of the presently disclosed apparatus.

Telepresent Social Spaces

In an alternative exemplary embodiment, a network of multiple instances of the apparatus may be deployed to remote locations in public spaces such as but not limited to restaurants, café's, museums, and art galleries. A credit card payment device, or similar wireless mobile device payment gateway such as Apple Passport, would be attached. Users in remote locations could reserve time to connect to a friend, colleague, or family member, to share a full-scale face-to-face dinner, meeting, or other activity in a public venue.

Extrasensory Simulation

In an exemplary embodiment, additional measurement devices such as thermometers, barometric pressure sensors, and scent input sensors such as Aromyx's Beta EssenceChip,™ may be attached to a pair of connected devices in remote locations. Each apparatus may augment the visual image with moisture and temperature control, and scent projection to create an even more immersive telepresence experience.

Mobile Device Extension

In one exemplary embodiment, the apparatus could communicate with mobile devices to videoconference, via a remote Internet connection and the mobile device's camera. This could be configured to benefit employees in an office with a more direct videoconference experience while communicating with colleagues in the field.

Portability

In one exemplary embodiment, the apparatus would be configured for only the top half of a user's body, in order to create a lightweight, portable version. Internal components, and projector brightness could be reduced to provide a less costly experience that which could easily be moved.

Portable, Satellite Enabled with Solar Power

An extension to the previous embodiment could further enhance the apparatus for travelling large distances by attaching a solar cell battery, and satellite data network attachment.

Two Camera Perspective Correction

In one exemplary embodiment, the use of two cameras would be used and custom software to reconstruct the two images in a way that simulates a closer perspective to human eyesight than a single camera embodiment.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

What is claimed is:

1. A method for simultaneously recording a first live video stream and projecting a second live video stream onto an interactive touch screen, the method comprising:
   recording through a touch screen panel a first live video stream through a first device;
   receiving at the first device a second video stream recorded at a second device;
   using an active shutter lens proximate to a lens of a video camera, simultaneously projecting a first image and a second image;
   presenting a first view to the lens of the video camera to see the first image and presenting a second view to a user to see the second image;
   using a projector projecting the second image onto the touch screen panel; and
   tracking movement of an object using a movement tracking apparatus, the movement tracking apparatus adapted to be in communication with the at least one video camera; and
   using a video processing engine providing for the alternating frames of the first video stream and the second video stream to enable simultaneous recording of the first live video stream and display of the second live video stream.

2. The method of claim 1 further comprising remotely receiving the second video stream.

3. The method of claim 1 further comprising receiving a command from a server to actuate a dispensing apparatus at the first device or second device.

4. The method of claim 1 further comprising receiving a command from a server to actuate a dispensing apparatus at the first device and second device simultaneously.

5. The method of claim 4 wherein the objects are selected from the group consisting of beverages, food items, money, personal goods, and combinations thereof.

6. The method of claim 1 further comprising positioning the at least one video camera in accordance with the movement of the object.

7. The method of claim 1 wherein the object is a person.

8. The method of claim 1 wherein the touch screen panel has at least one infra-red beam generator and the method further comprises tracking hand and finger movement by emitting a grid of infra-red beams from the at least one infra-red beam generator.

9. The method of claim 1 further comprising, based on tracking movement of a user's head, adjusting an angle of the video camera to simulate eye-to-eye contact.

* * * * *